(12) United States Patent
Hatano et al.

(10) Patent No.: US 9,993,901 B2
(45) Date of Patent: Jun. 12, 2018

(54) CLAMPING DEVICE

(71) Applicants: Hiroshi Hatano, Shizuoka (JP); Nao Ishiyama, Shizuoka (JP); Shinya Inui, Shizuoka (JP); Yuuki Ogata, Shizuoka (JP)

(72) Inventors: Hiroshi Hatano, Shizuoka (JP); Nao Ishiyama, Shizuoka (JP); Shinya Inui, Shizuoka (JP); Yuuki Ogata, Shizuoka (JP)

(73) Assignee: NTN CORPORATION, Osaka (JP)

( * ) Notice: Subject to any disclaimer, the term of this patent is extended or adjusted under 35 U.S.C. 154(b) by 25 days.

(21) Appl. No.: 15/216,798

(22) Filed: Jul. 22, 2016

(65) Prior Publication Data

US 2016/0325389 A1  Nov. 10, 2016

Related U.S. Application Data

(62) Division of application No. 14/127,235, filed as application No. PCT/JP2012/065474 on Jun. 18, 2012, now Pat. No. 9,427,837.

(30) Foreign Application Priority Data

Jul. 12, 2011 (JP) ................................ 2011-153840
Sep. 26, 2011 (JP) ................................ 2011-209448

(51) Int. Cl.
*B23P 19/10* (2006.01)
*B23P 19/08* (2006.01)
(Continued)

(52) U.S. Cl.
CPC ............. *B23P 19/086* (2013.01); *B23P 19/04* (2013.01); *B23P 19/084* (2013.01); *B23P 19/10* (2013.01);
(Continued)

(58) Field of Classification Search
CPC ........... Y10T 29/4978; Y10T 29/49778; Y10T 29/53061; Y10T 29/53417; B23P 19/12;
(Continued)

(56) References Cited

U.S. PATENT DOCUMENTS 4,996,765 A    3/1991 Maruyama et al.
2003/0126737 A1 7/2003 Yamamoto et al.
(Continued)

FOREIGN PATENT DOCUMENTS

CN    101175927    5/2008
CN    101779067    7/2010
(Continued)

OTHER PUBLICATIONS

International Search Report dated Aug. 28, 2012 in International (PCT) Application No. PCT/JP2012/065474.
(Continued)

*Primary Examiner* — Jermie Cozart
(74) *Attorney, Agent, or Firm* — Wenderoth, Lind & Ponack, L.L.P.

(57) ABSTRACT

A boot band for fixing a boot that is mounted to a constant velocity universal joint is clamped. The boot band and the constant velocity universal joint are aligned in phase with each other in a circumferential direction. An axial position of a clamping portion is thereafter aligned with an axial position of the boot band. Then, the boot band is clamped by the clamping portion.

14 Claims, 19 Drawing Sheets

(51) Int. Cl.
  *B23P 19/04* (2006.01)
  *B23P 21/00* (2006.01)
  *F16D 3/205* (2006.01)
  *F16D 3/223* (2011.01)
  *F16D 3/84* (2006.01)
  *F16D 3/16* (2006.01)

(52) U.S. Cl.
  CPC .......... *B23P 19/107* (2013.01); *B23P 21/002* (2013.01); *F16D 3/16* (2013.01); *F16D 3/2055* (2013.01); *F16D 3/223* (2013.01); *F16D 3/845* (2013.01); *F16D 2003/22316* (2013.01); *Y10T 29/4978* (2015.01); *Y10T 29/49778* (2015.01); *Y10T 29/49959* (2015.01); *Y10T 29/53061* (2015.01); *Y10T 29/53978* (2015.01); *Y10T 29/53991* (2015.01)

(58) Field of Classification Search
  CPC ....... B23P 19/107; B23P 19/105; B23P 19/04; B23P 21/002; B23P 2700/11; F16D 3/2055; F16D 3/845; F16J 3/042
  See application file for complete search history.

(56) References Cited

U.S. PATENT DOCUMENTS

| | | |
|---|---|---|
| 2003/0126738 A1 | 7/2003 | Yamamoto |
| 2010/0130294 A1 | 5/2010 | Nakagawa |

FOREIGN PATENT DOCUMENTS

| | | |
|---|---|---|
| JP | 62-32074 | 7/1987 |
| JP | 2-76649 | 3/1990 |
| JP | 2-104929 | 8/1990 |
| JP | 7-251336 | 10/1995 |
| JP | 7-256526 | 10/1995 |
| JP | 2001-219960 | 8/2001 |
| JP | 2001-334424 | 12/2001 |
| JP | 2005-66721 | 3/2005 |

OTHER PUBLICATIONS

Written Opinion of the International Searching Authority dated Aug. 28, 2012 in International (PCT) Application No. PCT/JP2012/065474 with partial English translation.
Chinese Office Action dated Sep. 17, 2015 in corresponding Chinese Patent Application No. 201280034333.5 with English translation.

θP(θP') : ANGLE OF SINGLE OPERATION
θ : ENTIRE OPERATING ANGLE

CLAMPING DEVICE

TECHNICAL FIELD

The present invention relates to a clamping method and device for clamping a boot band that is used for fixing a boot to be mounted to a constant velocity universal joint.

BACKGROUND ART

A constant velocity universal joint used for power transmission in automobiles and various industrial machines has a bellows boot mounted thereon so as to prevent intrusion of foreign matter such as dust into the joint and leakage of grease sealed inside the joint. As a material for the constant velocity universal joint boot, there are well-known a silicone material, a CR material (chloroprene), a VAMAC material (ethylene-acrylic rubber), and a CM material (chlorinated polyethylene).

Examples of the boot band include what is called a one-touch band. As illustrated in FIG. 22, a boot band 1 called one-touch band is obtained by curving a band member 2 made of a belt-like metal material into a ring shape, and coupling both ends thereof to each other in an overlapping manner. A lever 4 is firmly fixed to one side of an overlapping portion 3 of the band member 2.

The boot band 1 is mounted to a boot as follows. First, the band member 2 having the ring shape is fitted loosely to an outside of a boot mount portion of the boot. In this state, the lever 4 is folded back as indicated by an arrow a by utilizing leverage. In this way, the band member 2 fitted to the boot mount portion of the boot is radially shrunken to fasten the mount portion of the boot. Note that, an end portion of the lever 4 thus folded back is latched to a stopper 5 arranged near the overlapping portion 3.

In conventional cases, generally, an operator manually positions the boot band 1 described above, and then clamps the stopper 5 with jigs and tools such as a hammer. In such a case, work hours and quality may vary due to differences of the skill level of the operator. As a countermeasure, as described, for example, in Patent Literature 1, there have been proposed devices for automatically fastening such stopper 5.

Further, the boot band includes what is called an omega band as illustrated in FIG. 23. Also in this case, a belt-like member 9 is looped into a ring shape, fitted to an outside of the band mount portion of the boot, and then radially shrunken. Specifically, the belt-like member 9 includes engagement holes 6 provided at a part that come to an outer side of the overlapping portion, and protrusions 7 that come to an inner side of the overlapping portion when the belt-like member 9 is looped into a ring shape.

Then, the protrusions 7 are engaged with the engagement holes 6 from a radially inner side. In this state, a force of reducing a circumferential length is applied. In order to apply the reduction force, a fastening lobe portion (projection portion having a rectangular shape in cross-section) 8 provided at the part that comes to the outer side of the overlapping portion is plastically deformed (clamped). Specifically, clamping is performed by applying a pressing force as indicated by arrows β and β to the projection portion 8 illustrated by imaginary lines in a manner that proximal side walls thereof are brought close to each other. As described, for example, in Patent Literature 2, there have been proposed a device for clamping the projection portion 8.

Further, examples of the band include a low profile band as described, for example, in Patent Literature 3. This band is obtained by looping a belt-like member 151 as illustrated in FIG. 24 into a ring shape as illustrated in FIG. 25, and being fitted to the outside of the mount portion of the boot.

The belt-like member 151 includes, on its one end portion side, a protruding portion 152 provided to project to a front surface side, a claw portion 153 provided near the protruding portion 152, and protruding portions 154 and 155 provided near the claw portion 153 so as to project to the front surface side. Further, the belt-like member 151 includes, on its another end portion side, a rectangular engagement hole 156, and an elongated hole 157 provided near the engagement hole 156. In addition, on an opposite side with respect to the engagement hole of the elongated hole 157, a protruding portion 158 is provided to project to the front surface side.

Description is made of a method of fixing a boot with use of this band. First, as illustrated in FIG. 25A, the belt-like member 151 is looped into a ring shape so as to fit the protruding portion 152 to the elongated hole 157. In other words, a ring portion 159 is formed, and fitted loosely to the outside of the band mount portion of the boot. In this case, the protruding portion 152 is arranged on the engagement hole 156 side in the elongated hole 157.

After that, the protruding portion 158 and the protruding portion 152 are nipped with a tool 160 described below (refer to FIG. 26). In this state, the tool 160 is operated to bring the protruding portion 152 and the protruding portion 158 close relative to each other as illustrated in FIG. 25B. With this approach, the ring portion 159 is gradually radially shrunken. Then, as illustrated in FIG. 25C, under a state in which the protruding portion 152 and the protruding portion 158 are held in contact with each other, the protruding portion 155 is engaged with the engagement hole 156, and the protruding portion 154 is engaged with the engagement hole 156 side of the elongated hole 157. In this way, the band fastens the band mount portion of the boot, and the boot can be firmly fixed to an outer joint member of a constant velocity universal joint, and to a shaft fitted into an inner joint member of the constant velocity universal joint.

CITATION LIST

Patent Literature 1: JP 62-32074 B
Patent Literature 2: JP 2001-334424 A
Patent Literature 3: JP 2001-219960 A

SUMMARY OF INVENTION

Technical Problems

However, even when fastening is performed with automated equipment as described above in Patent Literature 1 and Patent Literature 2, the following problems remain unsolved. Specifically, there are a difficulty in automation of phase alignment in a circumferential direction between the outer joint member of the constant velocity universal joint and a portion to be clamped of a band, and a necessity of correcting a position to be clamped in an axial direction with a clamping unit (mechanism for performing clamping) with respect to each assembly product due to a wide range of tolerance of a band clamping position in the axial direction.

Further, in order to bring the protruding portions of the boot band as illustrated in FIG. 24, which are spaced apart from each other at a predetermined interval along the circumferential direction, close to each other with the tool 160 as illustrated in FIG. 26, first, the boot band is set into a state as illustrated in FIG. 26A. Specifically, with respect to a band mount portion 161a of a boot 161, the belt-like member 151 is looped to form a ring portion 162. With this, the protruding portions 152 and 158 arranged at the predetermined interval along the circumferential direction are projected to a radially outer side.

Further, the tool 160 comprises a pair of claw members 163 and 163. In this case, the claw members 163 and 163 pivot about a pivot shaft, specifically, pivot along a circular arc (trajectory) 165.

Specifically, in an initial state illustrated in FIG. 26A, when the claw members 163 and 163 are pivoted to reduce the interval between the protruding portions 152 and 158, engagement portions 163a and 163a of the claw members 163 and 163 pivot in directions of arrows G along the circular hole 165. Thus, the engagement portions 163a and 163a are brought close to each other in directions of arrows M, and brought close also to the ring portion 162 in direction of arrows N. In this way, the ring portion 162 is radially shrunken to bring the protruding portions 152 and 158 out of the circular hole 165.

Thus, the protruding portions 152 and 158 may not be pressed by the pivoted engagement portions 163a and 163a. In such a case, the ring portion 162 may not be radially shrunken, or the engagement portions 163a and 163a may be brought into contact with the ring portion 162 to deform the ring portion 162. In this way, the radial shrinking operation cannot be stably performed. As a countermeasure, conventionally, an operator needs to adjust positions of the claw members so as not to bring the engagement portions 163a and 163a into contact with the ring portion 162, and this adjustment is manually performed by a skilled person.

In view of the circumstances, the present invention provides a clamping method and a clamping device that enable automatic mount and fixation of a boot to a constant velocity universal joint with a band, and allow even unskilled novices to stably radially shrink the boot band so as to fix the boot to a boot mount portion.

Solution to Problem

According to one embodiment of the present invention, there is provided a clamping method for clamping a boot band for fixing a boot to be mounted to a constant velocity universal joint by radially shrinking the boot band with use of clamping means comprising a pair of claw members, the clamping method comprising: positioning the pair of claw members in a circumferential direction; positioning the pair of claw members so that an axial position of the pair of claw members is aligned with an axial position of the boot band; and clamping the boot band with use of the pair of claw members.

According to the clamping method of the present invention, the pair of claw members are positioned in the circumferential direction, and the axial position of the pair of claw members and the axial position of the boot band are aligned with each other. Thus, the boot band can be stably clamped with use of the pair of claw members.

It is preferred that the clamping method further comprise: aligning the boot band and the constant velocity universal joint in phase with each other in the circumferential direction; aligning an axial position of a clamping portion of the clamping means with the axial position of the boot band; and clamping the boot band with use of the clamping means.

With this, under a state in which the boot band is clamped with use of the clamping means, the boot band and the constant velocity universal joint have already been aligned in phase with each other in the circumferential direction, and the axial position of the clamping portion of the clamping means has already been aligned with the axial position of the boot band. Thus, the portion to be clamped of the band can be stably clamped. In addition, the clamping can be performed with the clamping means, and hence a clamping operation need not be manually performed by a skilled person.

It is preferred that the aligning of the boot band and the constant velocity universal joint in phase with each other in the circumferential direction be carried out by positioning the boot band in the circumferential direction, and then rotating the constant velocity universal joint in the circumferential direction with respect to the boot band.

Further, the aligning of the boot band and the constant velocity universal joint in phase with each other in the circumferential direction may be carried out by positioning the boot band in the circumferential direction, then confirming completion of the positioning of the boot band in the circumferential direction, then rotating the constant velocity universal joint in the circumferential direction, and then detecting a position of the constant velocity universal joint.

A detection part in the circumferential direction of the constant velocity universal joint may comprise a radially outermost portion of an outer joint member of the constant velocity universal joint.

The clamping method may further comprise: detecting the axial position of the boot band; and correcting the axial position of the clamping portion of the clamping means based on the detected axial position of the boot band.

The clamping method is used for constructing a shaft assembly comprising: a shaft; a fixed type constant velocity universal joint that is coupled to an end portion on one side of the shaft; and a plunging type constant velocity universal joint that is coupled to an end portion on another side of the shaft.

According to one embodiment of the present invention, there is provided a shaft assembly comprising: a shaft; a fixed type constant velocity universal joint that is coupled to an end portion on one side of the shaft; and a plunging type constant velocity universal joint that is coupled to an end portion on another side of the shaft, the shaft assembly being constructed by the above-mentioned clamping method.

Further, in the clamping method, a belt-like member may be looped into a ring shape so as to form a ring portion that is fitted to an outside of a band mount portion of the boot, the ring portion may comprise a pair of protruding portions spaced apart from each other at a predetermined pitch along the circumferential direction, and the pair of protruding portions may be brought close to each other along the circumferential direction so as to radially shrink the ring portion. The clamping method may further comprise: positioning the pair of claw members both in the circumferential direction and an axial direction; displacing the pair of claw members into a radial direction of the ring portion while pivoting, under a state in which the pair of protruding portions of the ring portion are nipped with distal engagement positions of the pair of claw members, the pair of claw members about a pivot portion into a direction in which the pair of claw members are brought close to each other; and changing positions of the distal engagement portions of the pair of claw members in a manner of following displacements in both the radial direction and the circumferential direction of the pair of protruding portions along with radial shrinkage of the ring portion.

According to this clamping method, the positions of the distal engagement portions of the pair of claw members can be changed in a manner of following the displacements in both the radial direction and the circumferential direction of the pair of protruding portions along with the radial shrinkage of the ring portion. Thus, the pair of protruding portions can be brought close to each other along the circumferential direction while the distal engagement portions of the pair of claw members are prevented from being brought into contact with the ring portion to be radially shrunken or from being separated from the pair of protruding portions.

It is preferred that the clamping method further comprise: obtaining in advance arithmetic values of from circumferential positions and radial positions before a start of an approach operation of the pair of protruding portions to circumferential positions and radial positions after an end of the approach operation of the pair of protruding portions; and changing the positions of the distal engagement portions of the pair of claw members based on the arithmetic values.

With this setting, the positions of the distal engagement portions of the pair of claw members are changed based on the preset arithmetic values. Thus, the operation of bringing the pair of protruding portions close to each other is stabilized.

A pivoting operation of the pair of claw members and a moving operation in the radial direction of the pair of claw members may interlock with each other. When the operations interlock with each other as described above, the approach operation of the pair of protruding portions can be smoothly performed.

The clamping method may further comprise: providing a plurality of intermediate positions between the circumferential positions and the radial positions before the start of the approach operation of the pair of protruding portions and the circumferential positions and the radial positions after the end of the approach operation of the pair of protruding portions; and radially shrinking the ring portion while stopping the ring portion at each of the plurality of intermediate positions. With this setting, an amount of a single operation of the pair of claw members can be reduced.

According to one embodiment of the present invention, there is provided a constant velocity universal joint, comprising a boot for sealing an inside of the constant velocity universal joint, wherein the constant velocity universal joint is fastened and mounted to a band mount portion of the boot by the above-mentioned clamping method.

According to one embodiment of the present invention, there is provided a shaft assembly comprising: a shaft; a fixed type constant velocity universal joint that is coupled to an end portion on one side of the shaft; and a plunging type constant velocity universal joint that is coupled to an end portion on another side of the shaft, the shaft assembly being constructed by the above-mentioned clamping method.

According to one embodiment of the present invention, there is provided a clamping device for a boot band for fixing a boot that is mounted to a constant velocity universal joint, the clamping device being configured to radially shrink the boot band with use of clamping means comprising a pair of claw members, the clamping device comprising: band positioning means for positioning the boot band; and position alignment means for aligning an axial position of the pair of claw members of the clamping means with an axial position of the boot band.

According to the clamping device of the present invention, the pair of claw members are positioned in the circumferential direction, and the axial position of the pair of claw members and the axial position of the boot band are aligned with each other. Thus, the boot band can be stably clamped with use of the pair of claw members.

In this case, it is preferred that the clamping device further comprise: the band positioning means for positioning the boot band in a circumferential direction; joint positioning means for positioning the constant velocity universal joint in the circumferential direction; and position alignment means for aligning an axial position of a clamping portion of the clamping means with the axial position of the boot band under a state in which the boot band and the constant velocity universal joint are aligned in phase with each other in the circumferential direction with the band positioning means and the joint positioning means.

According to the clamping device, the boot band can be positioned in the circumferential direction with the band positioning means, and the constant velocity universal joint can be positioned in the circumferential direction with the joint positioning means. Thus, the boot band and the constant velocity universal joint are aligned in phase with each other in the circumferential direction with the band positioning means and the joint positioning means. Then, in this state, with use of the position alignment means, the axial position of the clamping portion of the clamping means can be aligned with the axial position of the boot band.

The band positioning means may comprise: a positioning jig against which a band protruding portion as a part to be clamped is brought into abutment; and a band rotational drive mechanism for rotating the boot band along the circumferential direction so as to bring the band protruding portion into abutment against the positioning jig. With such means, the band protruding portion can be brought into abutment against the positioning jig by rotating the band with the band rotational drive mechanism along the circumferential direction. With this, the band can be positioned in the circumferential direction. Further, it is preferred that the band positioning means comprise confirmation detecting means for confirming the positioning.

The joint positioning means may comprise: joint detecting means for detecting a predetermined circumferential position of the constant velocity universal joint; and a joint rotational drive mechanism for rotating the constant velocity universal joint along the circumferential direction based on the predetermined circumferential position detected by the joint detecting means. With such means, the predetermined circumferential position of the constant velocity universal joint can be detected with the detecting means. Based on values detected by the detecting means, the constant velocity universal joint is rotated with the joint rotational drive mechanism along the circumferential direction. In this way, the constant velocity universal joint and the band can be aligned in phase with each other in the circumferential direction. Further, the clamping device may further comprise axial position detecting means for detecting the axial position of the boot band.

It is preferred that the position alignment means comprise detecting means for detecting the axial position of the boot band. With provision of the detecting means, the alignment in position in the axial direction can be performed with higher accuracy. The detecting means may comprise an image processing mechanism and a non-contact sensor. The image processing mechanism comprises a CCD camera, converts an image of a target, which is captured by the CCD camera, to a digital signal, and performs various arithmetic processes so as to extract features such as an area, lengths, the number, and positions of the target. Then, determination results are output based on a preset reference. The non-contact sensor refers to a displacement sensor utilizing a magnetic field, a light beam, or a sonic wave as a medium.

The detecting means of the band positioning means and the detecting means of the joint positioning means may each comprise any one of a contact sensor and a non-contact sensor. Further, the detecting means of the band positioning means may comprise a contact sensor, and the detecting means of the joint positioning means may comprise a non-contact sensor. Alternatively, the detecting means of the band positioning means may comprise a non-contact sensor, and the detecting means of the joint positioning means may comprise a contact sensor. Here, the contact sensor refers to a displacement sensor such as a dial gauge and a differential transformer, and the non-contact sensor refers to a displacement sensor utilizing a magnetic field, a light beam, or a sonic wave as a medium.

It is preferred that the clamping device, which is configured to loop a belt-like member into a ring shape so as to form a ring portion that is fitted to an outside of a band mount portion of the boot, the ring portion comprising a pair of protruding portions spaced apart from each other at a predetermined pitch along the circumferential direction, and configured to bring the pair of protruding portions close to each other in the circumferential direction so as to radially shrink the ring portion, comprise: the clamping means comprising the pair of claw members comprising distal engagement positions that pivot about a pivot portion into a direction in which the distal engagement positions are brought close to and spaced apart from each other; reciprocating means for reciprocating the pair of claw members of the clamping means into a direction in which the pair of claw members of the clamping means are brought close to and spaced apart from the band mount portion of the boot; drive means for pivoting the pair of claw members of the clamping means into a direction in which the pair of claw members of the clamping means are brought close to and spaced apart from each other; and control means for controlling the reciprocating means and the drive means so as to change positions of the distal engagement portions of the pair of claw members in a manner of following displacements in both a radial direction and the circumferential direction of the pair of protruding portions along with radial shrinkage of the ring portion.

By controlling the reciprocating means and the drive means with the control means, the positions of the distal engagement portions of the pair of claw members of the clamping means can be changed in a manner of following the displacements in both the radial direction and the circumferential direction of the pair of protruding portions along with the radial shrinkage of the ring portion. Thus, the pair of protruding portions can be brought close to each other along the circumferential direction while the distal engagement portions of the pair of claw members are prevented from being brought into contact with the ring portion to be radially shrunken or from being separated from the pair of protruding portions.

The reciprocating means and the drive means each may comprise a servo motor. The servo motor refers to a motor that is used for controlling a position, a speed, and the like in a servo mechanism. The servo motor comprises an AC servo motor, a DC servo motor, and a stepper motor. The AC servo motor has an advantage of being capable of performing positioning control with high accuracy depending on a combination with a positioning function, and the stepper motor has an advantage of capable of performing positioning drive with high accuracy through digital control.

There is provided a constant velocity universal joint, comprising a boot for sealing an inside of the constant velocity universal joint, wherein the constant velocity universal joint is fastened and mounted to a band mount portion of the boot by the above-mentioned boot clamping device for the constant velocity universal joint.

Advantageous Effects of Invention

According to one embodiment of the present invention, the band and the constant velocity universal joint can be automatically aligned in phase with each other in the circumferential direction, and the band and the clamping portion of the clamping means can be automatically aligned in position with each other in the axial direction. In addition, after the phase alignment in the circumferential direction and the position alignment in the axial direction are completed, the clamping operation with the clamping means can be performed. Thus, the band at a regular position can be clamped, and the boot can be fixed in a stable state to the constant velocity universal joint. Further, the clamping operation need not be manually performed by a skilled person, and burden of the operation on an operator can be reduced. In addition, the clamping operation can be performed with high accuracy regardless of the skill level of the operator.

Further, the pair of protruding portions can be brought close to each other along the circumferential direction while the distal engagement portions of the pair of claw members are prevented from being brought into contact with the ring portion to be radially shrunken or from being separated from the pair of protruding portions. In this way, the radial shrinking operation can be stably performed. Thus, the band mount portion of the boot can be stably fastened, and hence the boot can be stably mounted to the constant velocity universal joint.

DESCRIPTION OF EMBODIMENT

In the following, description is made of an embodiment of the present invention with reference to the drawings.

Figure 1:
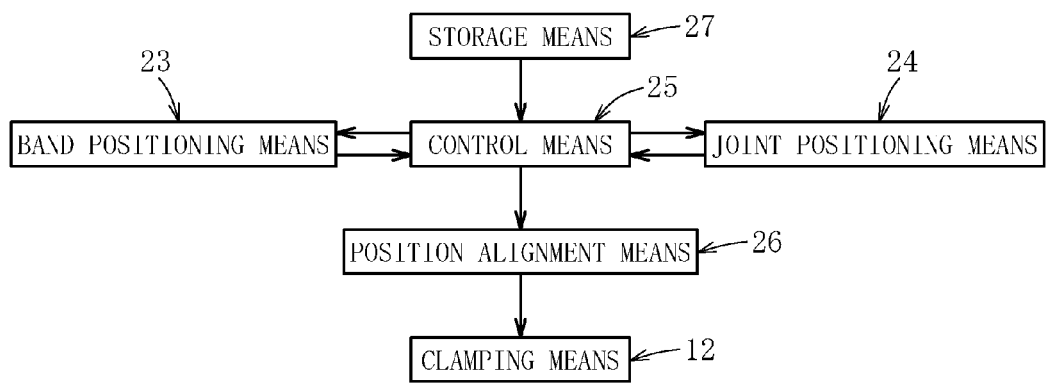
FIG. 1 is a block diagram illustrating an overall configuration of a clamping device according to an embodiment of the present invention.
Figure 2:
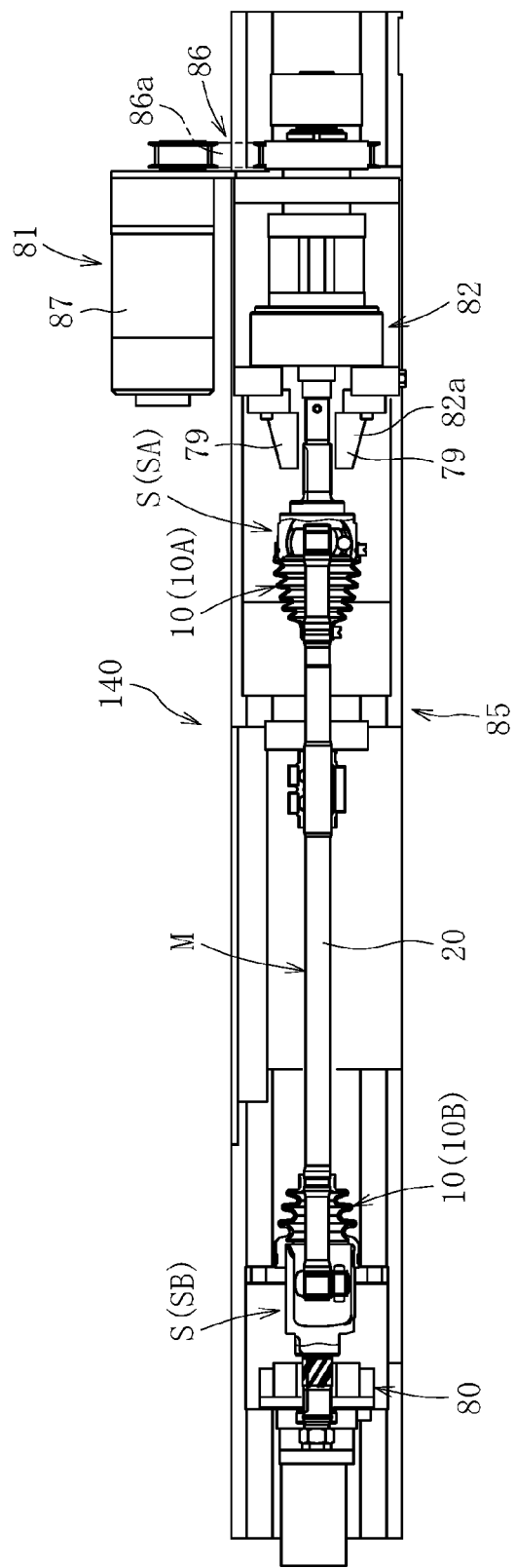
FIG. 2 is a plan view of a product fixing device of the clamping device.
Figure 3:
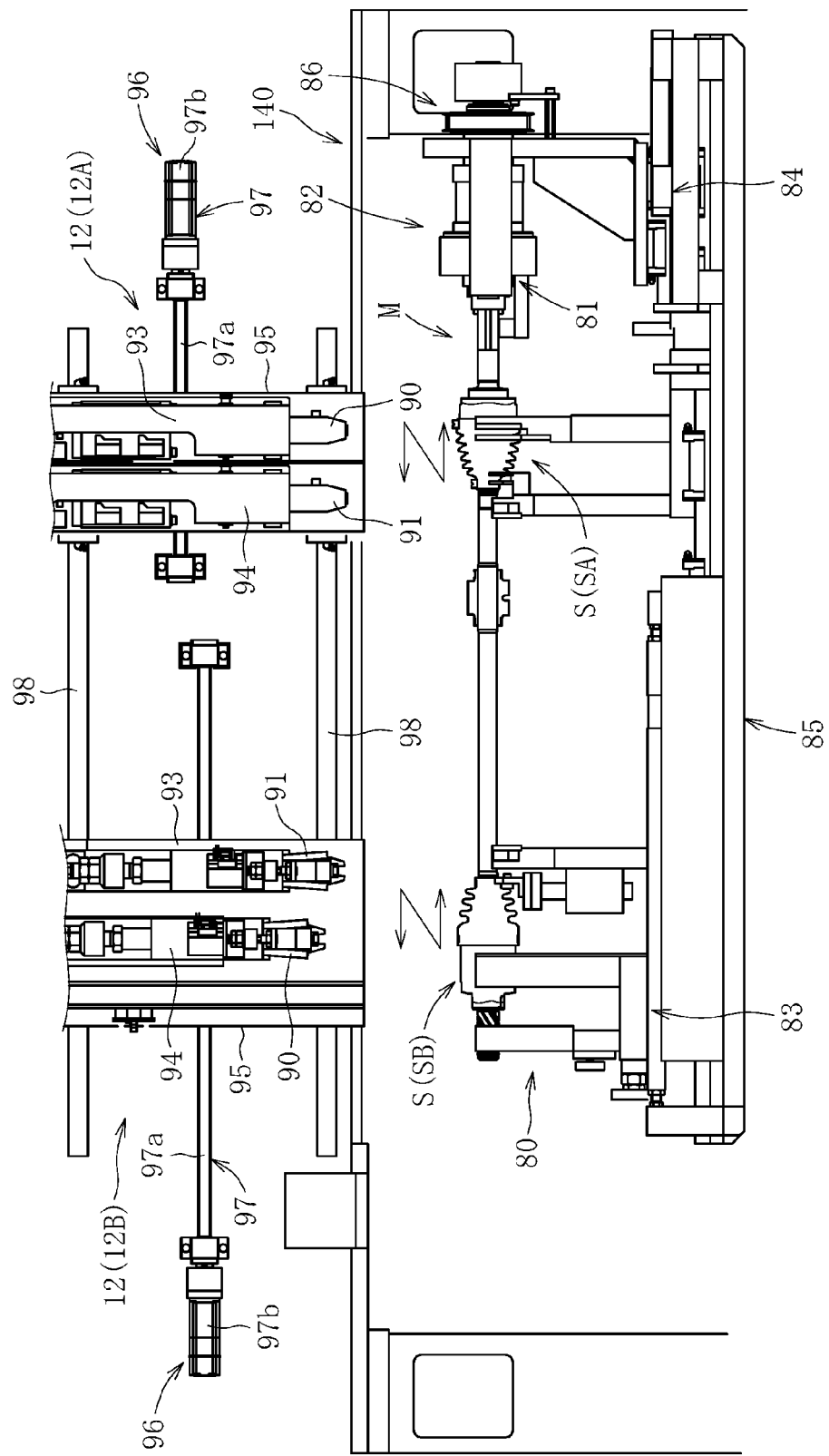
FIG. 3 is a front view of the clamping device.

FIG. 1 is a block diagram illustrating an overall configuration of a clamping device according to the present invention. FIG. 2 is a plan view of a product fixing device of the clamping device. FIG. 3 is a front view of the clamping device. The clamping device comprises a clamping device for a boot band 11 (11A, 11B) for fixing a boot 10 (10A, 10B) that is mounted to a constant velocity universal joint S (SA, SB) (refer to FIG. 10). The clamping device comprises clamping means 12 for clamping the boot band 11, band positioning means 23 for positioning the boot band 11 in a circumferential direction, joint positioning means 24 for positioning the constant velocity universal joint S in the circumferential direction, and position alignment means 26 for aligning an axial position of a clamping portion 13 of the clamping means 12 (refer, for example, to FIG. 7) with an axial position of the boot band 11 under a state in which the boot band 11 and the constant velocity universal joint S are aligned in phase with each other in the circumferential direction with the band positioning means 23 and the joint positioning means 24. In this context, the means 12, 23, 24, and 26 are controlled by control means 25. Data items of dimensions of products of a plurality of types are input from storage means 27 to the control means 25.

Here, the control means 25 comprises a microcomputer comprising a central processing unit (CPU) as a main part, a read only memory (ROM), a random access memory (RAM) that are connected to each other via a bus. A storage device as the storage means 27 comprises a hard disc drive (HDD), a digital versatile disk (DVD) drive, a compact disc-recordable (CD-R) drive, and an electronically erasable and programmable read only memory (EEPROM). Note that, the ROM stores programs that are executed by the CPU and the data items.

Figure 10:
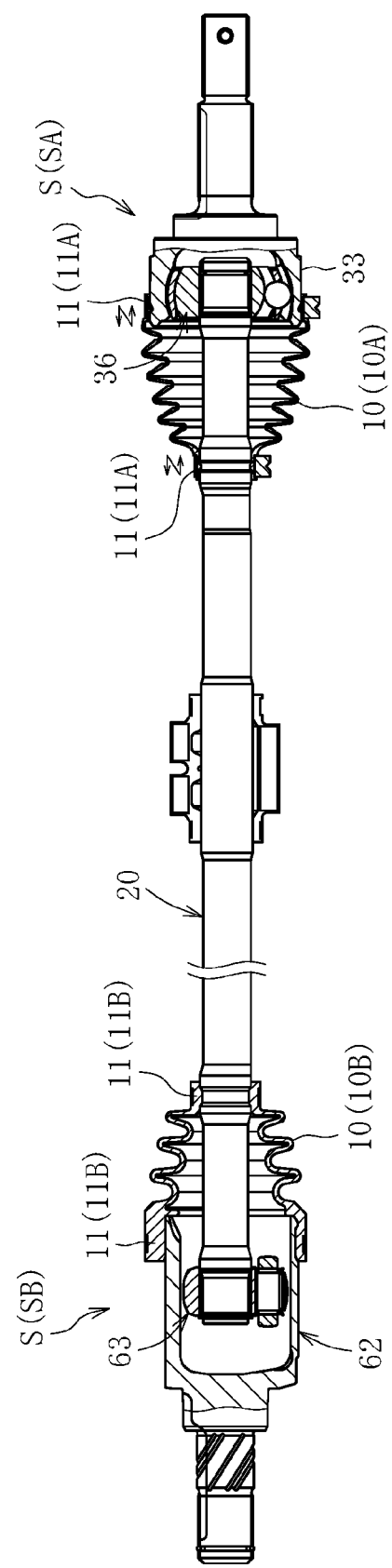
FIG. 10 is a plan view of a product.

The clamping device is used, for example, in an assembly step for a shaft assembly as illustrated in FIG. 10. The shaft assembly comprises a shaft (intermediate shaft) 20, the constant velocity universal joint (fixed type constant velocity universal joint) SA provided continuously with one end portion of the shaft 20, and the constant velocity universal joint (plunging type constant velocity universal joint) SB provided continuously with another end portion of the shaft 20.

Figure 11:
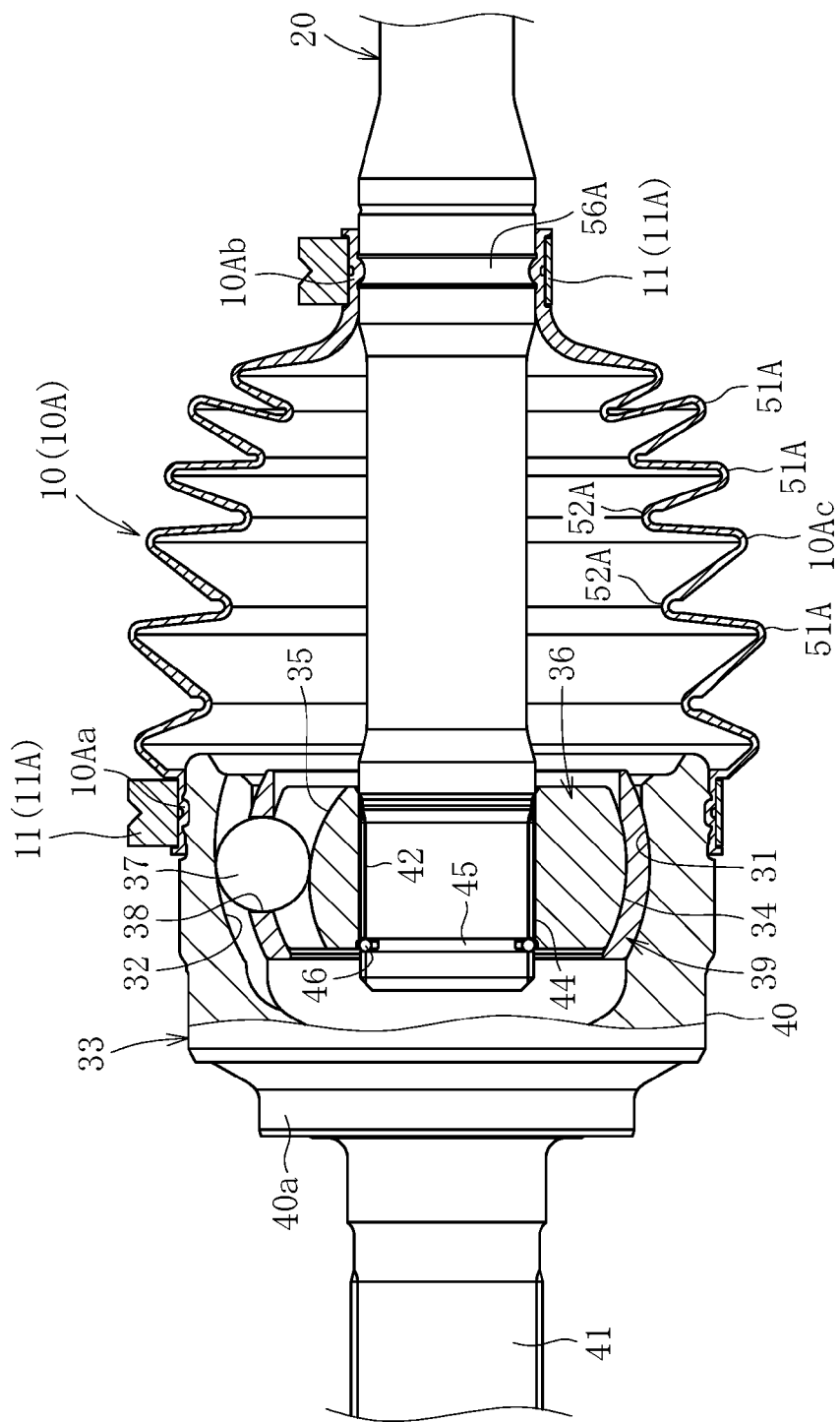
FIG. 11 is an enlarged sectional view of a fixed type constant velocity universal joint.

As illustrated in FIG. 11, the fixed type constant velocity universal joint SA comprises, as a main part, an outer joint member 33 having a radially inner surface 31 provided with a plurality of track grooves 32, an inner joint member 36 having a radially outer surface 34 provided with a plurality of track grooves 35, a plurality of balls 37 arranged in ball tracks formed by cooperation of the track grooves 32 of the outer joint member 33 and the track grooves 35 of the inner joint member 36, and a cage 39 comprising pockets 38 for receiving the balls 37.

Further, the outer joint member 33 comprises a mouth portion 40 having the radially inner surface 31 provided with the track grooves 32, and a stem portion 41 provided to protrude from a bottom wall 40a of the mouth portion 40. The inner joint member 36 has an axial hole provided with female splines 42, and the end portion of the shaft 20 is fitted into the axial hole of the inner joint member 36. The end portion of the shaft 20 is provided with male splines 44. With this, when the end portion of the shaft 20 is fitted into the axial hole of the inner joint member 36, the female splines 42 and the male splines 44 are fitted to each other.

A circumferential recessed groove 45 is formed across end portions of the female splines 42 of the shaft 20, and a stopper ring 46 is mounted to the circumferential recessed groove 45. The stopper ring 46 mounted in this way retains the shaft 20.

An opening portion of the outer joint member 33 is closed by the boot 10 (10A). The boot 10 is a resin boot, and comprises a large diameter portion 10Aa, a small diameter portion 10Ab, and a bellows portion 10Ac coupling the large diameter portion 10Aa and the small diameter portion 10Ab to each other. The bellows portion 10Ac comprises peak portions 51A and valley portions 52A formed alternately to each other. Further, the large diameter portion 10Aa of the boot 10A is fixed to the outer joint member 33 by fastening the boot band 11 (11A) under a state in which the large diameter portion 10Aa of the boot 10A is fitted to an outside of the opening portion of the outer joint member 33. In addition, the small diameter portion 10Ab of the boot 10 is fixed to the shaft 20 by fastening the boot band 11A under a state in which the small diameter portion 10Ab of the boot 10 is fitted to an outside of a boot mount portion 56A of the shaft 20.

Figure 12:
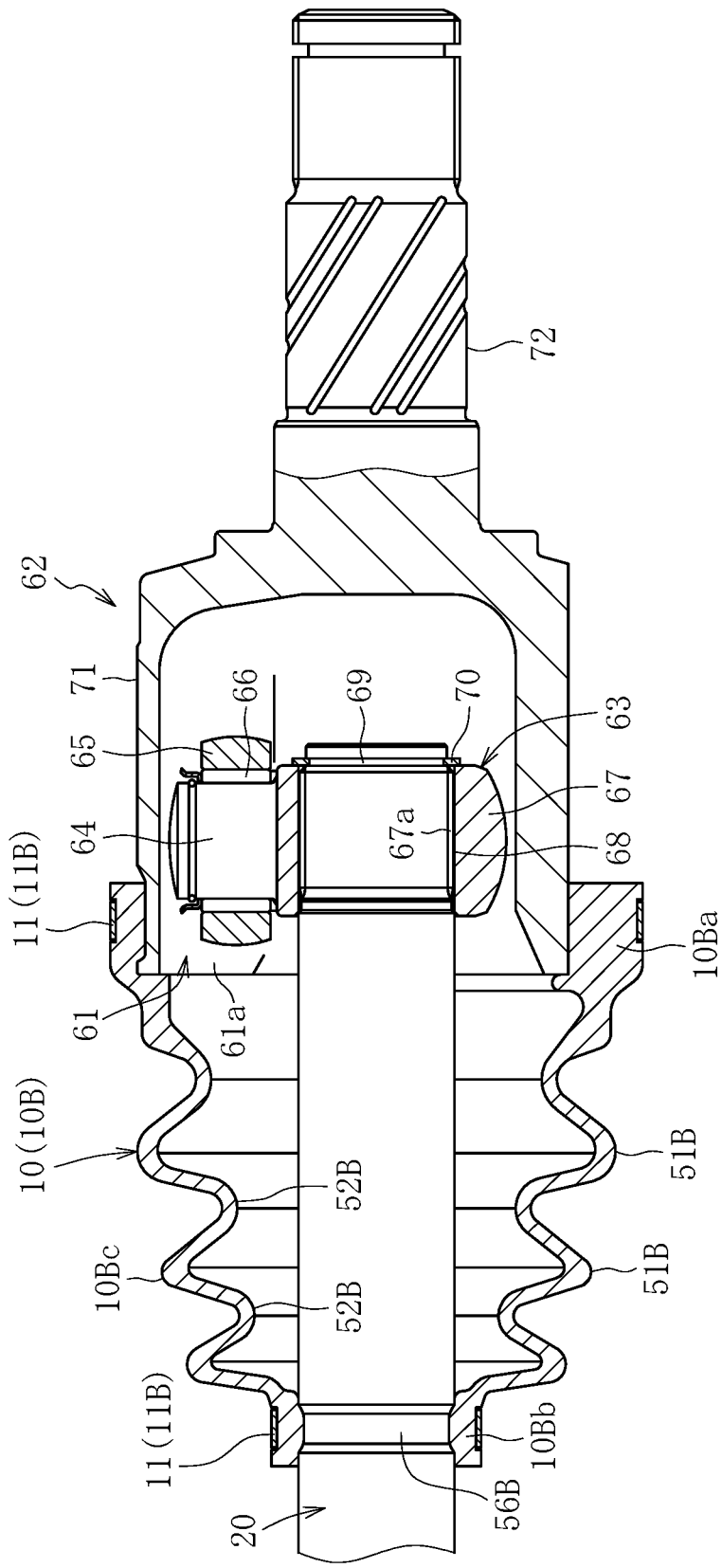
FIG. 12 is an enlarged sectional view of a plunging type constant velocity universal joint.

Further, as illustrated in FIG. 12, the plunging type constant velocity universal joint SB comprises an outer joint member 62 having an inner peripheral surface provided with three track grooves 61 that extend in an axial direction and having roller guide surfaces 61a and 61a extending in the axial direction along both sides of corresponding one of the track grooves 61, a tripod member 63 comprising three leg shafts 64 projecting in a radial direction, and rollers 65 supported to be freely rotatable by the leg shafts 64 of the tripod member 63 and inserted to be freely rollable in the track grooves 61 of the outer joint member 62.

Figure 6:
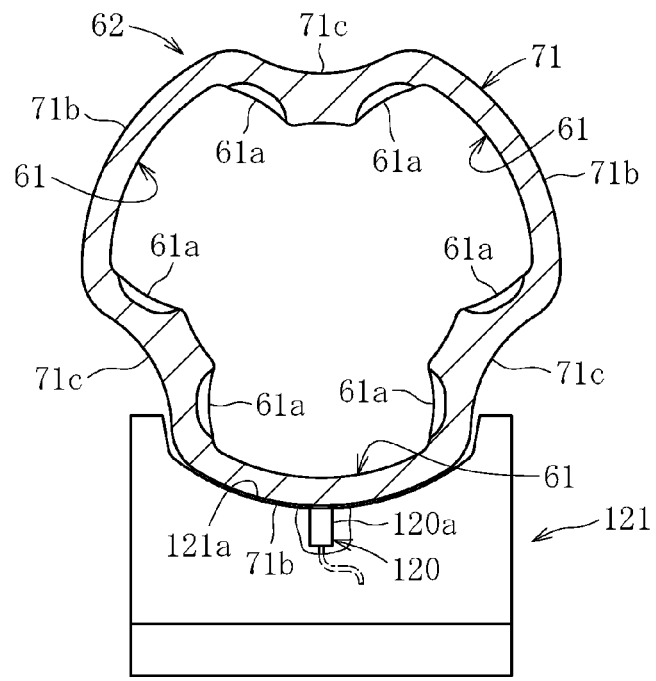
FIG. 6 is a sectional side view of joint positioning means of the clamping device.
Figure 7:
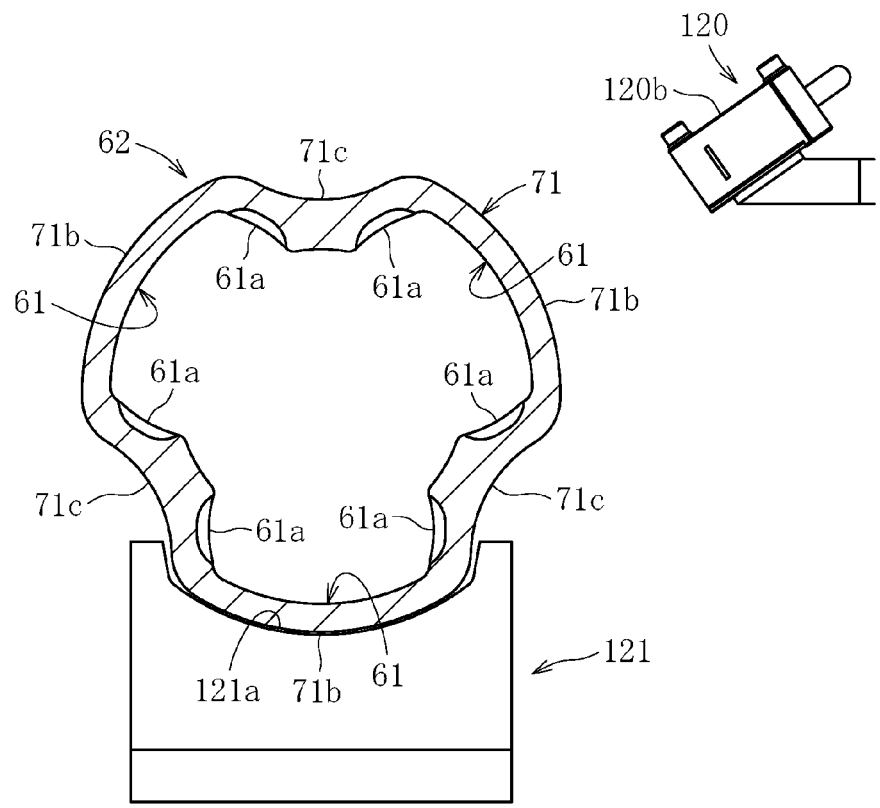
FIG. 7 is a sectional side view of another joint positioning means of the clamping device.

The outer joint member 62 comprises a mouth portion 71 provided with the track grooves 61, and a shaft portion 72 provided to protrude from a bottom portion 71a of the mouth portion 71. Further, as illustrated in FIGS. 6 and 7, the mouth portion 71 comprises large diameter portions 71b and small diameter portions 71c formed alternately to each other along the circumferential direction.

Torque transmitting members comprise the rollers 65 and needle rollers 66 interposed between the leg shaft 64 and the roller 65. Further, the tripod member 63 comprises a boss portion 67 and the leg shafts 64, and the boss portion 67 has an axial hole provided with female splines 67a.

The end portion of the shaft 20 is provided with male splines 68. With this, when the end portion of the shaft 20 is fitted into the axial hole of the tripod member 63, the female splines 67a and the male splines 68 are fitted to each other. A circumferential recessed groove 69 is formed across end portions of the male splines 68 of the shaft 20, and a stopper ring 70 is mounted to the circumferential recessed groove 69. The stopper ring 70 mounted in this way retains the shaft 20.

An opening portion of the outer joint member 62 is closed by the boot 10 (10B). The boot 10B is a rubber boot, and comprises a large diameter portion 10Ba, a small diameter portion 10Bb, and a bellows portion 10Bc coupling the large diameter portion 10Ba and the small diameter portion 10Bb to each other. The bellows portion 10Bc comprises peak portions 51B and valley portions 52B formed alternately to each other. Further, the large diameter portion 10Ba of the boot 10 is fixed to the outer joint member 62 by fastening the boot band 11 (11B) under a state in which the large diameter portion 10Ba of the boot 10 is fitted to an outside of the opening portion of the outer joint member 62. In addition, the small diameter portion 10Bb of the boot 10 is fixed to the shaft 20 by fastening the boot band 11B under a state in which the small diameter portion 10Bb of the boot 10 is fitted to an outside of a boot mount portion 56B of the shaft 20.

Figure 23:
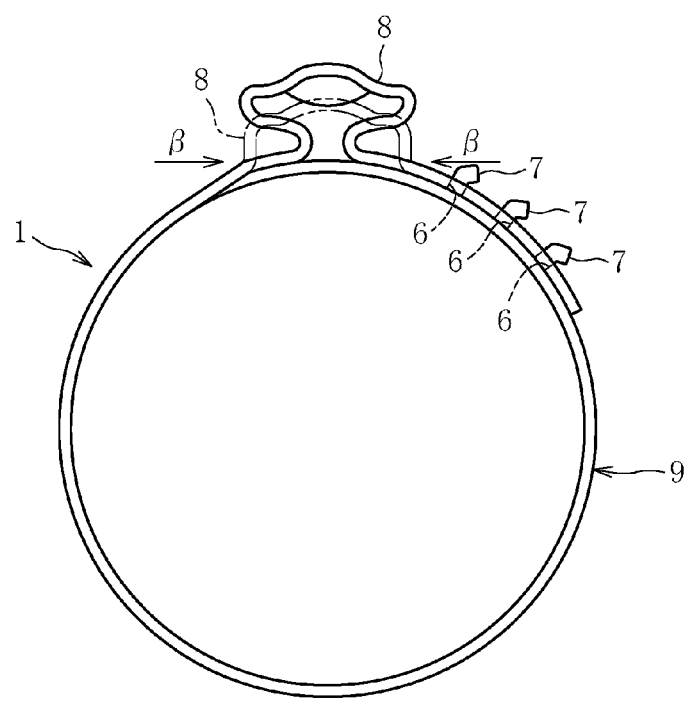
FIG. 23 is a schematic view of another conventional boot band.
Figure 24:
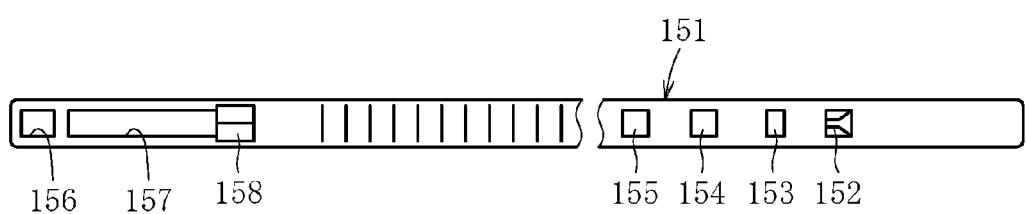
FIG. 24 is a schematic view of still another conventional boot band.
Figure 25A:
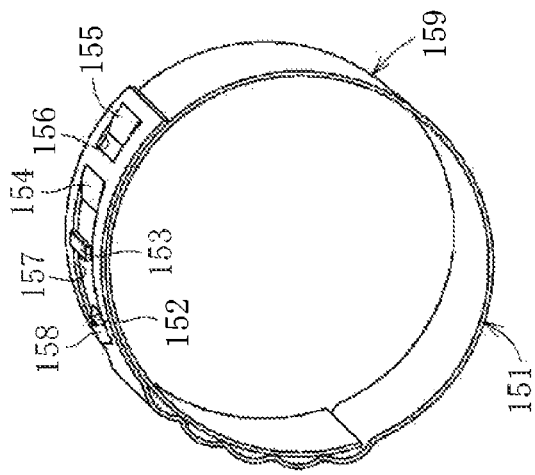
FIG. 25A is a schematic perspective view illustrating a non-fastened state in a conventional clamping method for the boot band illustrated in FIG. 24.
Figure 25B:
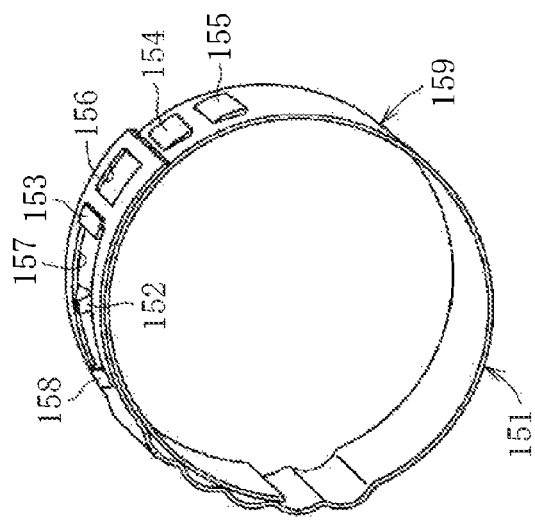
FIG. 25B is a schematic perspective view illustrating a halfway fastened state in the conventional clamping method for the boot band illustrated in FIG. 24.
Figure 25C:
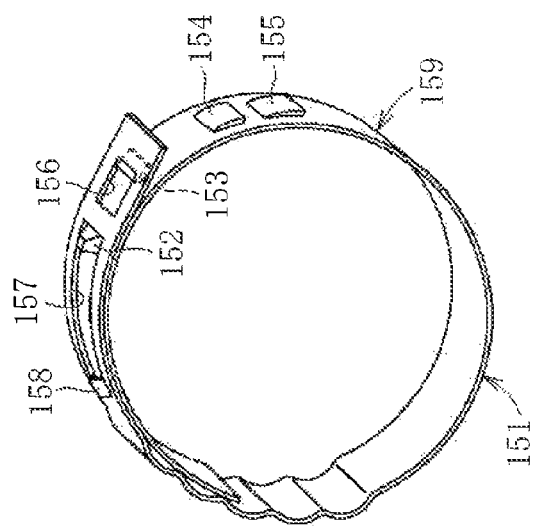
FIG. 25C is a schematic perspective view illustrating a fastened state in the conventional clamping method for the boot band illustrated in FIG. 24.
Figure 26A:
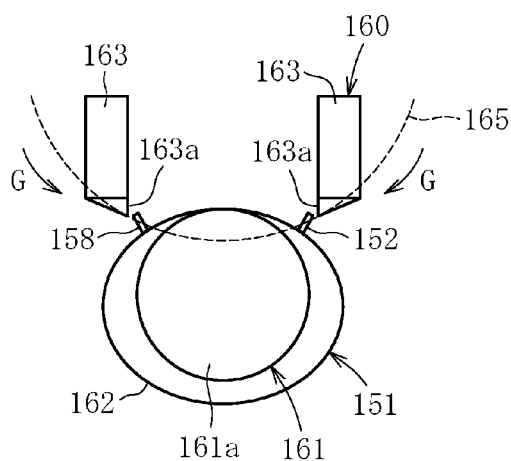
FIG. 26A is another schematic sectional view illustrating the non-fastened state in the conventional clamping method for the boot band illustrated in FIG. 24.
Figure 26B:
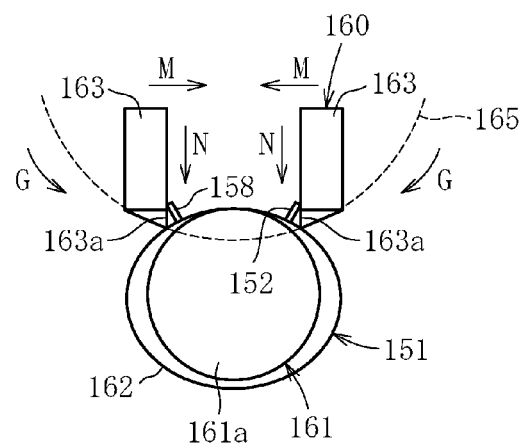
FIG. 26B is another schematic sectional view illustrating the fastened state in the conventional clamping method for the boot band illustrated in FIG. 24.

Thus, the clamping device is used for clamping the bands 11A and 11B for fixing the boots 10A and 10B that are mounted respectively to the constant velocity universal joints SA and SB. The clamping device comprises a product fixing device 140 as illustrated in FIG. 2. The bands 11A and 11B each comprise an omega-shaped boot band as illustrated in FIG. 23. Specifically, the bands 11A and 11B each comprise a projection portion 75, and clamping is performed by moving walls on both sides of the projection portion 75 close to each other.

As illustrated in FIGS. 2 and 3, the product fixing device 140 comprises a support mechanism 80 for supporting the another constant velocity universal joint SB, a chuck mechanism 82 for chucking the stem portion 41 of the outer joint member 33 of the one constant velocity universal joint SA, and a joint rotational drive mechanism 81 for rotating a chuck portion 82a of the chuck mechanism 82 about its axial center. Further, the support mechanism 80 and the chuck mechanism 82 are provided upright on a base 85 through intermediation of guide mechanisms 83 and 84 so as to be movable with respect to a product (shaft assembly) M in an axial direction thereof (capable of being adjusted in the axial direction). In this way, the support mechanism 80 and the chuck mechanism 82 are reciprocable along the axial direction of the product M. Note that, the joint rotational drive mechanism 81 reciprocates integrally with the chuck mechanism 82.

The joint rotational drive mechanism 81 comprises a drive motor (for example, servo motor) 87, and a transmitting mechanism 86 for transmitting a rotational force of the drive motor 87 to the chuck portion 82a of the chuck mechanism 82. Thus, when the joint rotational drive mechanism 81 is driven, the product M chucked by the chuck mechanism 82 is rotated about its axial center. Note that, the chuck portion 82a of the support mechanism 80 comprises a plurality of gripping blocks 79 that are arranged along the circumferential direction so as to be reciprocable in the radial direction. Further, the transmitting mechanism 86 comprises a belt mechanism 86a.

The clamping means 12 is arranged above the support mechanism 80, and comprises clamping means 12A for the fixed type constant velocity universal joint, and clamping means 12B for the plunging type constant velocity universal joint. Thus, the clamping means 12A is located above the fixed type constant velocity universal joint SA, and the clamping means 12B is located above the plunging type constant velocity universal joint SB.

The clamping means 12A and 12B each comprise a large diameter side clamping portion 90 for clamping the boot bands 11A and 11B that are mounted to the large diameter portions 10Aa and 10Ba of the boots 10A and 10B, and a small diameter side clamping portion 91 for clamping the boot bands 11A and 11B that are mounted to the small diameter portions 10Ab and 10Bb of the boots 10. As illustrated respectively in FIGS. 8 and 9, the large diameter side clamping portion 90 and the small diameter side clamping portion 91 each comprise a pair of claw members 92 and 92. The pair of claw members 92 and 92 are brought close to and spaced apart from each other. Specifically, when the claw members 92 and 92 are moved to a position corresponding to side walls of the boot band 11 under a state in which the claw members 92 and 92 are spaced apart from each other, and then the claw members 92 and 92 are brought close to each other in this corresponding state, the projection portion 75 of the boot band 11 can be clamped. With this, the boot band 11 can be radially shrunken.

Further, the large diameter side clamping portion 90 and the small diameter side clamping portion 91 are provided to a holding block 95 through intermediation of vertical movement mechanisms 93 and 94. Further, the holding blocks 95 and 95 are reciprocable along the axial direction of the product M through intermediation of reciprocating mechanisms 96 and 96. The reciprocating mechanisms 96 and 96 comprise guide rails 98 and 98 and each comprise a bolt-and-nut mechanism 97.

The bolt-and-nut mechanism 97 comprises a bolt shaft 97a arranged along a horizontal direction, a drive motor 97b for rotationally driving the bolt shaft 97a about its axial center, and nut members (not shown) that are threadedly engaged with the bolt shaft 97a. Further, the guide rails 98 and 98 are arranged above and below the bolt shaft 97a and parallel to the bolt shaft 97a. The nut members and sliders (not shown) that slide along the guide rails 98 and 98 are provided to each of the holding blocks 95 and 95.

Thus, by rotating the bolt shaft 97a about its axial center with the drive motor 97b of the bolt-and-nut mechanism 97, the holding block 95 can be reciprocated along the horizontal direction (axial direction of the product M) and the guide rails 98 and 98.

The vertical movement mechanisms 93 and 94 each may comprise a cylinder mechanism, and are capable of vertically moving the large diameter side clamping portion 90 and the small diameter side clamping portion 91. An opening-and-closing operation mechanism of the claw members 92 and 92 of each of the large diameter side clamping portion 90 and the small diameter side clamping portion 91 may also comprise a cylinder mechanism.

By driving the reciprocating mechanisms 96 and 96, the large diameter side clamping portion 90 and the small diameter side clamping portion 91 can be moved to positions above the boot band 11. In this state, the large diameter side clamping portion 90 and the small diameter side clamping portion 91 can be lowered to perform a clamping operation with the claw members 92 and 92. Note that, the large diameter side clamping portion 90 and the small diameter side clamping portion 91 provided to the holding block 95 can be brought close to and spaced apart from each other with an approach-and-separation mechanism (not shown) comprising a cylinder mechanism mechanism and a bolt-and-nut mechanism.

Figure 4:
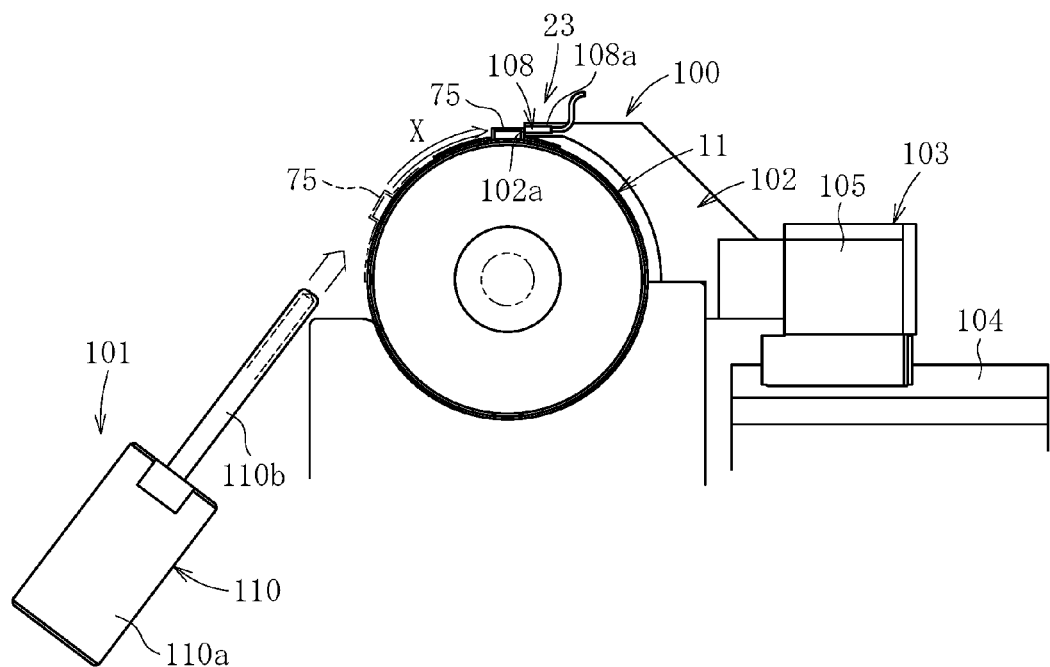
FIG. 4 is a side view of band positioning means of the clamping device.

As illustrated in FIG. 4, the band positioning means 23 may comprise a positioning jig 100 against which the band protruding portion 75 as a part to be clamped is brought into abutment, and a band rotational drive mechanism 101 for rotating the boot band 11 along the circumferential direction so as to bring the band protruding portion 75 into abutment against the positioning jig.

Figure 8:
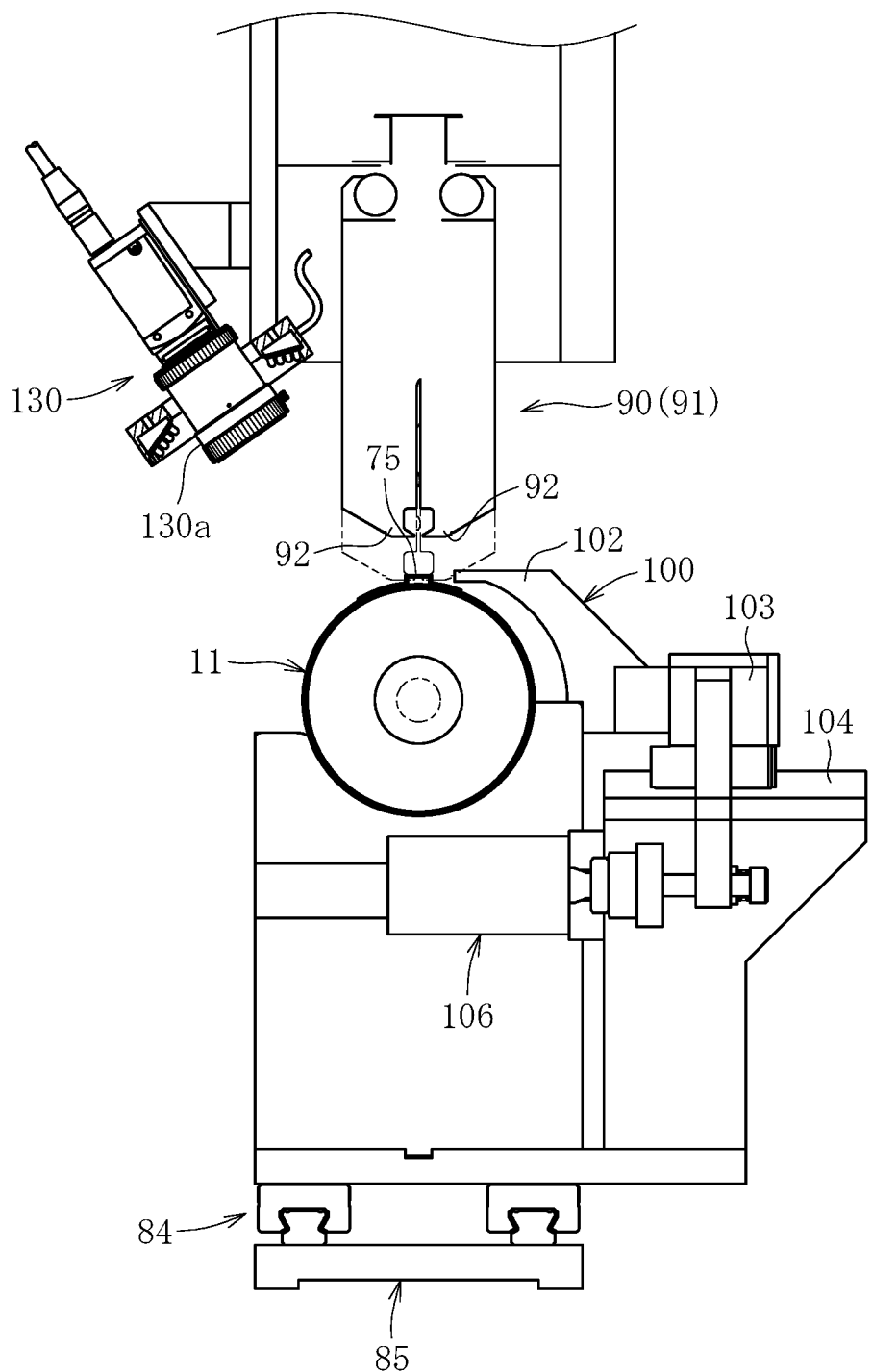
FIG. 8 is a side view of axial position detecting means of the clamping device.

The positioning jig 100 comprises a block unit 102 having an abutment surface 102a that abuts against the band protruding portion 75, and an adjustment mechanism 103 for bringing the block unit 102 close to and spacing the block unit 102 apart from the band protruding portion 75. The adjustment mechanism 103 comprises a sliding unit 105 that slides along a guide rail 104. Further, the block unit 102 is provided to the sliding unit 105. As illustrated in FIG. 8 and the like, the sliding unit 105 is slid by a reciprocating mechanism 106 such as a cylinder mechanism.

In other words, the reciprocating mechanism 106 is driven to slide the sliding unit 105 along the guide rail 104. With this, the abutment surface 102a of the block unit 102 is brought close to and spaced apart from the band protruding portion 75.

Further, band detecting means 108 for detecting whether or not the band protruding portion 75 is positioned is provided to the block unit 102. In this embodiment, the detecting means 108 comprises a contact sensor 108a. The contact sensor 108a generally comprises a differential transformer comprising three coils and a movable magnetic core. When a primary coil is excited by an alternating voltage (voltage having a constant frequency), the movable magnetic core that is moved in conjunction with an object to be measured generates induced voltages in secondary coils. A difference obtained through differential coupling of the voltages is detected as a displacement output. When the movable magnetic core is located at a left-right symmetrical position, that is, at a center, the alternating voltages induced on the left and right are equal to each other. As a result, the difference between the voltages is zero. Therefore, the output is zero. When the position of the movable magnetic core is displaced from the center, the induced voltages of the coils on the left and right are unequal to each other. As a result, an alternating voltage in proportion to the difference is generated. When this alternating voltage is compared to the alternating voltage passed through the primary coil, a case where the movable magnetic core is located on the right and a case where the movable magnetic core is located on the left are reverse to each other in wave pattern (phase). Through utilization of this phenomenon, specifically, through conversion of amounts of displacements of the movable magnetic core toward the left and right to a positive or negative magnitude of a direct voltage, a displacement of the movable magnetic core is measured. In this way, whether or not the band protruding portion 75 is held in abutment against the abutment surface 102a of the block unit 102 can be detected.

The rotational drive mechanism 101 comprises an air jetting device 110. Specifically, the air jetting device 110 comprises a main body portion 110a, and an air jetting nozzle 110b provided to protrude from the main body portion 110a. More specifically, as indicated by an imaginary line in FIG. 4, under a state in which the band protruding portion 75 is out of abutment against the abutment surface 102a of the block unit 102, air is jetted from the air jetting nozzle 110b toward the band protruding portion 75 so as to rotate the band 11 in a direction of an arrow X about its axial center. In this way, the band protruding portion 75 is held in abutment against the abutment surface 102a of the block unit 102.

Figure 5:
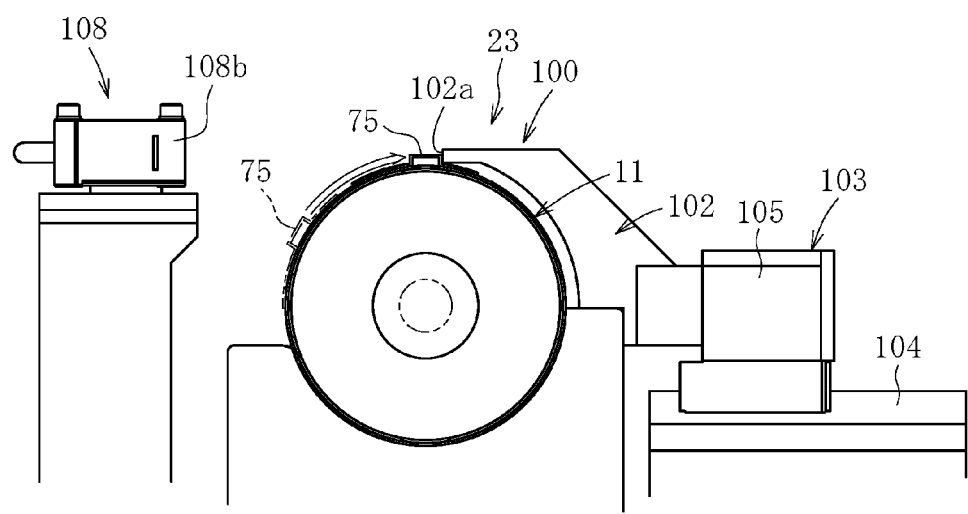
FIG. 5 is a side view of another band positioning means of the clamping device.

In FIG. 5, a non-contact sensor 108b serves as the band detecting means 108. The non-contact sensor 108b refers to a displacement sensor utilizing a magnetic field, a light beam, or a sonic wave as a medium. Specifically, the non-contact sensor comprises an eddy current type, an ultrasonic type, an optical type, and a capacitance type. Thus, the detecting means 108 in this embodiment may comprise the non-contact sensors of those various types. Note that, in this embodiment, an optical adjustable range reflective sensor is used. The adjustable range reflective sensor comprises a light projecting lens and a light receiving lens. A light beam exiting from the light projecting lens and radiated to and reflected by a detection object (band protruding portion 75) is received by the light receiving lens, and then guided to a two-split photodiode. Here, a distance is determined based on a position at which rates of output voltages generated in the vertically two-split photodiode are equal to each other.

Thus, also with use of the non-contact sensor 108b, whether or not the band protruding portion 75 is held in abutment against the positioning jig 100 can be determined. In this way, whether or not the band 11 is positioned in the circumferential direction can be confirmed.

By the way, the positioning means 23 illustrated in FIGS. 4, 5, and the like is provided correspondingly to each of the band 11 on a large diameter side and the band 11 on a small diameter side of each of the constant velocity universal joints SA and SB. In such a case, four positioning means 23 are needed. Therefore, there may be employed a configuration in which one or two positioning means are moved to positions of the bands 11.

Further, FIGS. 6 and 7 each illustrate joint detecting means 120 used for positioning the constant velocity universal joint in the circumferential direction. A contact sensor 120a is used in FIG. 6, and a non-contact sensor 120b is used in FIG. 7. Note that, FIGS. 6 and 7 illustrate the position detecting means 120 of the plunging type constant velocity universal joint SB.

The contact sensor 120a in FIG. 6 comprises a displacement sensor provided to the support mechanism 80, such as a dial gauge and a differential transformer. Specifically, the support mechanism 80 comprises a receiving member 121 comprising a fitting portion 121a to which the large diameter portions 71b of the outer joint member 62 of the constant velocity universal joint SB illustrated in FIG. 6 and the like is fitted. Further, the contact sensor 120*a* is arranged in the fitting portion 121*a*. Thus, the contact sensor 120*a* detects a radially outermost portion of the outer joint member 62.

Thus, the joint detecting means 120 and the above-mentioned joint rotational drive mechanism 81 can serve as the joint positioning means 24. Specifically, the constant velocity universal joint SB is rotated about its axial center, and a circumferential position of the large diameter portions 71*b* of the outer joint member 62 is detected with the contact sensor 120*a*. Then, rotation about the axial center is stopped. In this way, the constant velocity universal joint can be positioned in the circumferential direction.

In FIG. 7, the non-contact sensor 120*b* comprises a non-contact sensor similar to the non-contact sensor 108*b* of the band detecting means 108, and hence may comprise sensors of an eddy current type, an ultrasonic type, an optical type, and a capacitance type. Thus, also with use of this non-contact sensor 120*b*, the constant velocity universal joint can be positioned in the circumferential direction.

As illustrated in FIG. 8, this device comprises detecting means 130 for detecting the axial position of the boot band 11. The detecting means 130 may comprise an image processing mechanism 130*a*, and a non-contact sensor 130*b* as illustrated in FIG. 9.

Figure 9:
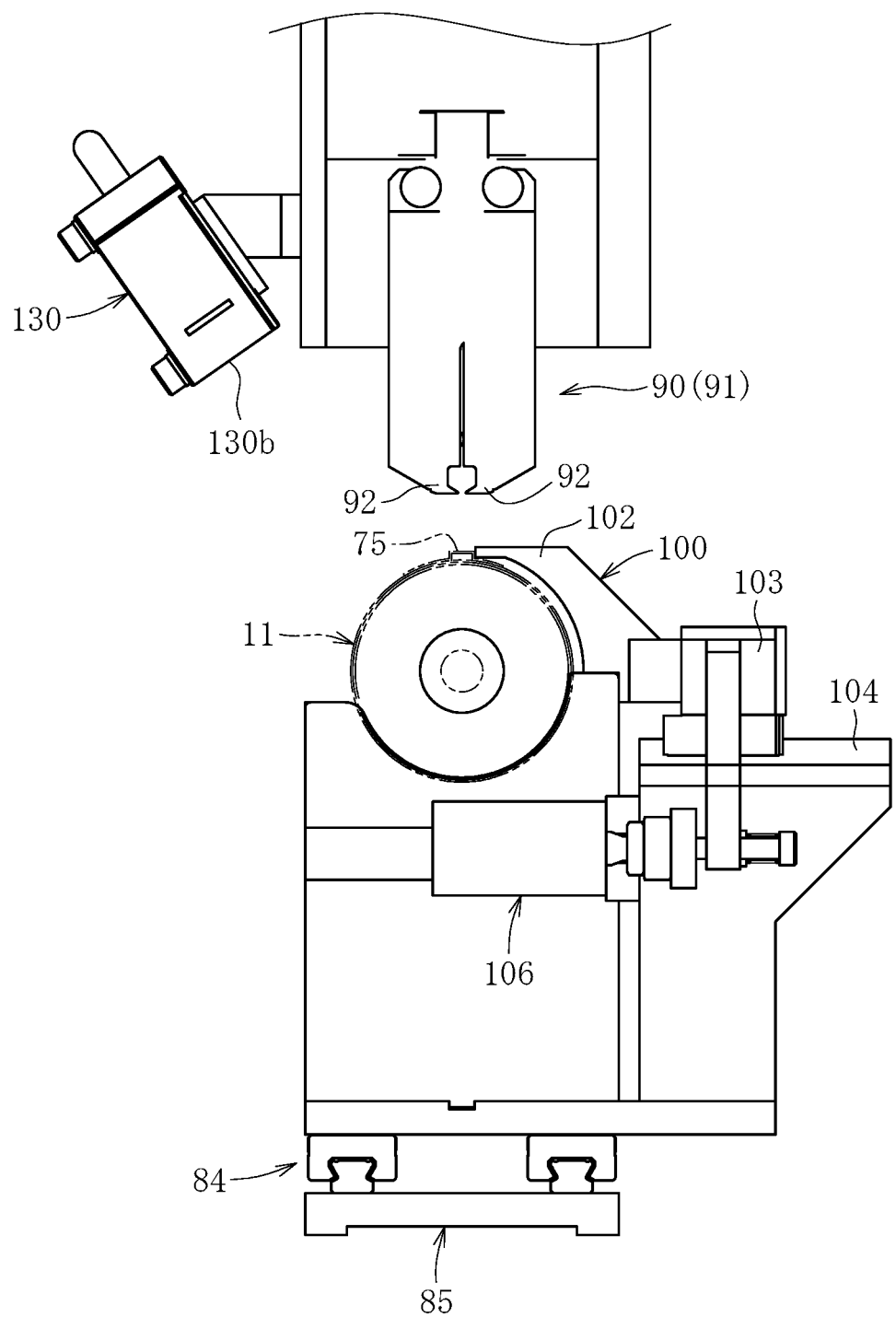
FIG. 9 is a side view of another axial position detecting means of the clamping device.

By the way, the detecting means 130 illustrated in FIGS. 8, 9, and the like is provided correspondingly to each of the band 11 on the large diameter side and the band 11 on the small diameter side of each of the constant velocity universal joints SA and SB. In such a case, four detecting means 130 are needed. Therefore, there may be employed a configuration in which one or two detecting means 130 are moved to the positions of the bands 11.

The image processing mechanism 130*a* comprises a CCD camera, converts an image of a target, which is captured by the CCD camera, to a digital signal, and performs various arithmetic processes so as to extract features such as an area, lengths, the number, and positions of the target. Then, determination results are output based on a preset reference.

When the image processing mechanism 130*a* is used, an image of the boot band 11 can be captured, and the axial position of the boot band 11 can be detected based on the image. Based on the position, the clamping portion 13 of the clamping means 12 can be moved along the axial direction of the product. In this way, the boot band 11 can be aligned in position in the axial direction.

As illustrated in FIG. 9, the detecting means 130 may comprise the non-contact sensor 130*b*. In this case, as well as the non-contact sensor 108*b*, the non-contact sensor 130*b* comprises non-contact sensors of an eddy current type, an ultrasonic type, an optical type, and a capacitance type.

When the non-contact sensor 130*b* is provided, the axial position of the boot band 11 can be detected with the non-contact sensor 130*b*. Based on the position, the clamping portion 13 of the clamping means 12 can be moved along the axial direction of the product M. In this way, the boot band 11 can be aligned in position in the axial direction.

Next, description is made of a method of clamping the boot band with the clamping device structured as described above. First, as illustrated in FIG. 2, the product M (shaft assembly) is fixed to the product fixing device 140. Specifically, the another constant velocity universal joint SB is supported with the support mechanism 80, and the stem portion 41 of the outer joint member 33 of the one constant velocity universal joint SA is chucked with the chuck mechanism 82. In this case, the boot bands 11 (11A and 11B) are fitted in advance to the outsides of the large diameter portions 10Aa and 10Ba and the small diameter portions 10Ab and 10Bb of the boots 10A and 10B.

Then, the boot bands 11 are aligned in position in the circumferential direction with use of the band positioning means 23. Specifically, as illustrated in FIG. 4, the boot band 11 is rotated about its axial center with the rotational drive mechanism 101 so as to abut the band protruding portion 75 against an abutment portion of the positioning jig 100. At this time, abutment is confirmed with the detecting means 108. In this way, the boot bands 11 are positioned in the circumferential direction.

Next, the constant velocity universal joints SA and SB are positioned with use of the joint positioning means 24. Specifically, the product M is rotated about its axial center with use of the joint rotational drive mechanism 81 so as to align the constant velocity universal joints SA and SB with the bands in position in the circumferential direction.

After that, with use of the position alignment means 26, the clamping portion 13 of the clamping means 12 is aligned with the axial position of the boot band 11. Specifically, the axial position of the clamping portion 13 of the clamping means 12 is aligned with the axial position of the boot band 11. Next, the clamping portion 13 of each of the clamping means 12 is lowered to clamp the projection portion 75 of each of the boot bands 11. In this way, the boot 10 can be fixed with each of the boot bands 11.

In the present invention, the boot bands 11 and the constant velocity universal joint S can be automatically aligned in phase with each other in the circumferential direction, and the bands 11 and the clamping portions 13 of the clamping means 12 can be automatically aligned in position with each other in the axial direction. In addition, after the phase alignment in the circumferential direction and the position alignment in the axial direction are completed, the clamping operation with the clamping means 12 can be performed. Thus, the bands 11 at regular positions can be clamped, and the boot 10 can be fixed in a stable state to the constant velocity universal joint S. Further, the clamping operation need not be manually performed by a skilled person, and burden of the operation on an operator can be reduced. In addition, the clamping operation can be performed with high accuracy regardless of the skill level of the operator.

The band detecting means 108 and the joint detecting means 120 each may comprise a contact sensor or a non-contact sensor. Further, the axial detecting means 130 may comprise an image processing mechanism or a non-contact sensor. With this, a degree of freedom in design for the device becomes higher, and the clamping device can be stably set in accordance with an installation site.

Figure 19:
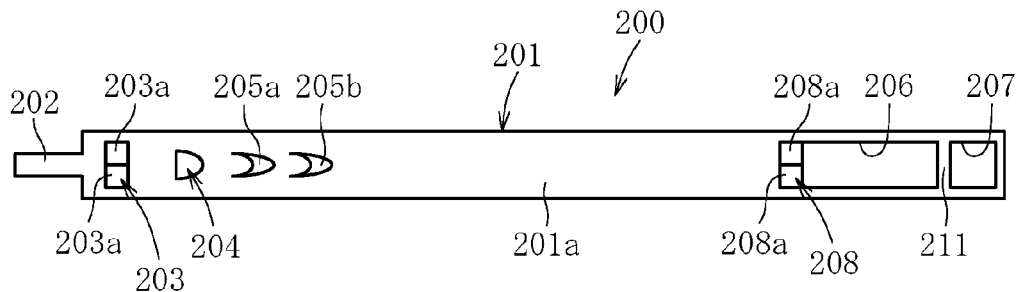
FIG. 19 is a plan view of the boot band.
Figure 20:
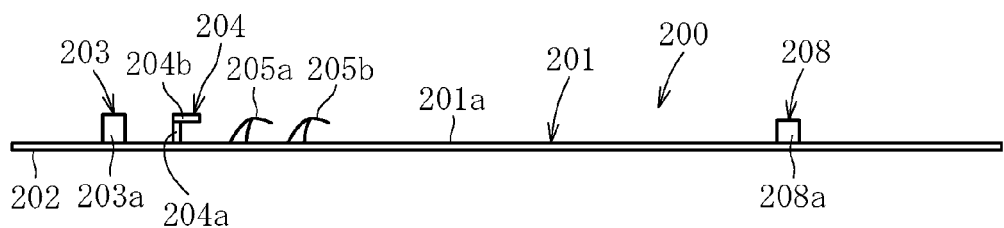
FIG. 20 is a side view of the boot band illustrated in FIG. 19.
Figure 21:
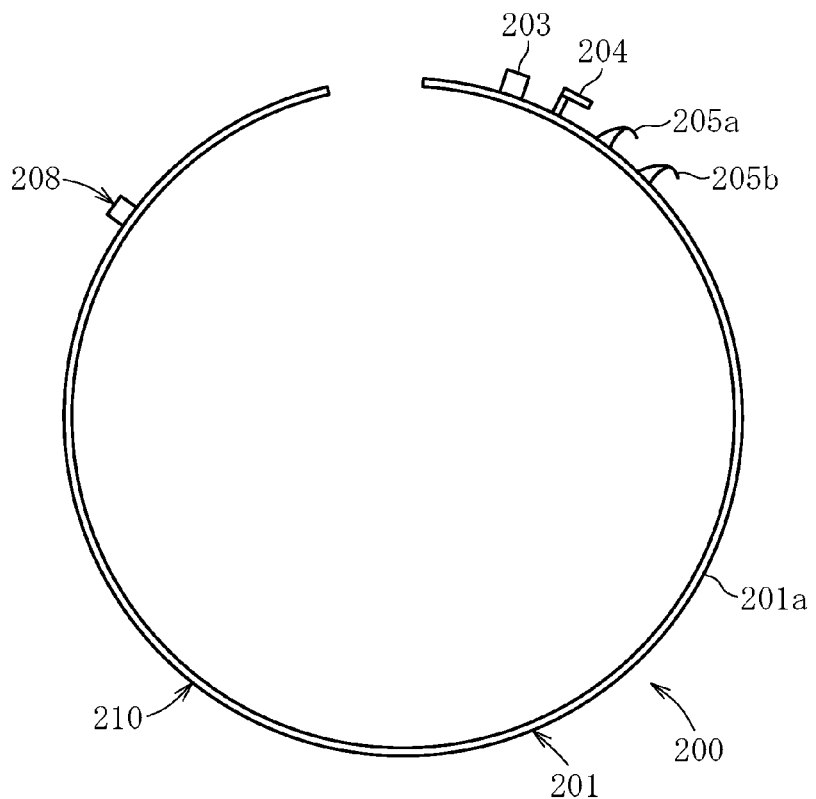
FIG. 21 is a side view illustrating a state in which the boot band illustrated in FIG. 19 is looped into a ring shape.
Figure 22:
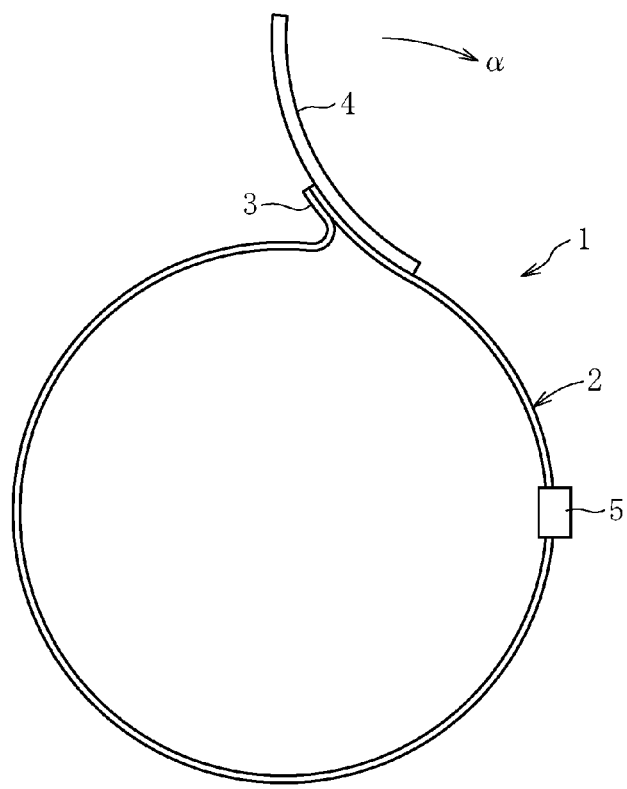
FIG. 22 is a plan view of a conventional boot band.

By the way, a boot band 200 comprises a belt-like member 201 as illustrated in FIGS. 19 to 21. The belt-like member 201 made of a metal comprises a narrow portion 202 formed on one end side thereof, and a protruding portion 203 formed near the narrow portion 202 so as to project to a front surface 201*a* side. Further, on the protruding portion 203 side, a protruding portion 204, and engagement pieces 205*a* and 205*b* are provided to project to the front surface 201*a* side. Still further, on another end side of the belt-like member 201, an elongated rectangular hole 206 and a square engagement hole 207 are provided. In addition, on an opposite side with respect to the engagement hole of the elongated rectangular hole 206, a protruding portion 208 is provided to project to the front surface 201*a* side.

The protruding portion 203 and the protruding portion 208 comprise triangular bodies formed of a pair of inclined pieces 203*a* and 203*a*, and a pair of inclined pieces 208*a* and

208*a*. The protruding portion 204 comprises an upright piece 204*a* provided to project upright from the front surface 201*a* of the belt-like member 201, and a parallel piece 204*b* extending from the upright piece 204*a* substantially parallel to the belt-like member 201. Further, the engagement pieces 205*a* and 205*b* are each formed into a hook shape. Note that, examples of a material for the boot band 200 comprise aluminum or stainless steel, but the present invention is not limited thereto. In other words, materials that have a rigidity sufficient to fasten the large diameter portion and the small diameter portion of the boot 10 and to maintain the fastened state, and are less liable to be deteriorated, for example, in use environment of the constant velocity universal joint may be selected.

Description is made of a method of fastening the band 200 structured as described above. First, as illustrated in FIG. 21, the band 200 is looped into a ring shape so as to form a ring portion 210. At the time of looping, the one end side on which the protruding portions 203 and 204 and the engagement pieces 205*a* and 205*b* are provided is brought to a radially inner side with respect to the another end side on which the elongated hole 206 and the engagement hole 207 are provided. Then, the protruding portion 203 on the one end side is fitted into the elongated hole 206 from the radially inner side. This state is referred to as an initial radially shrunken state. In this case, the protruding portion 203 is located on the engagement hole 207 side in the elongated hole 206.

Figure 13:
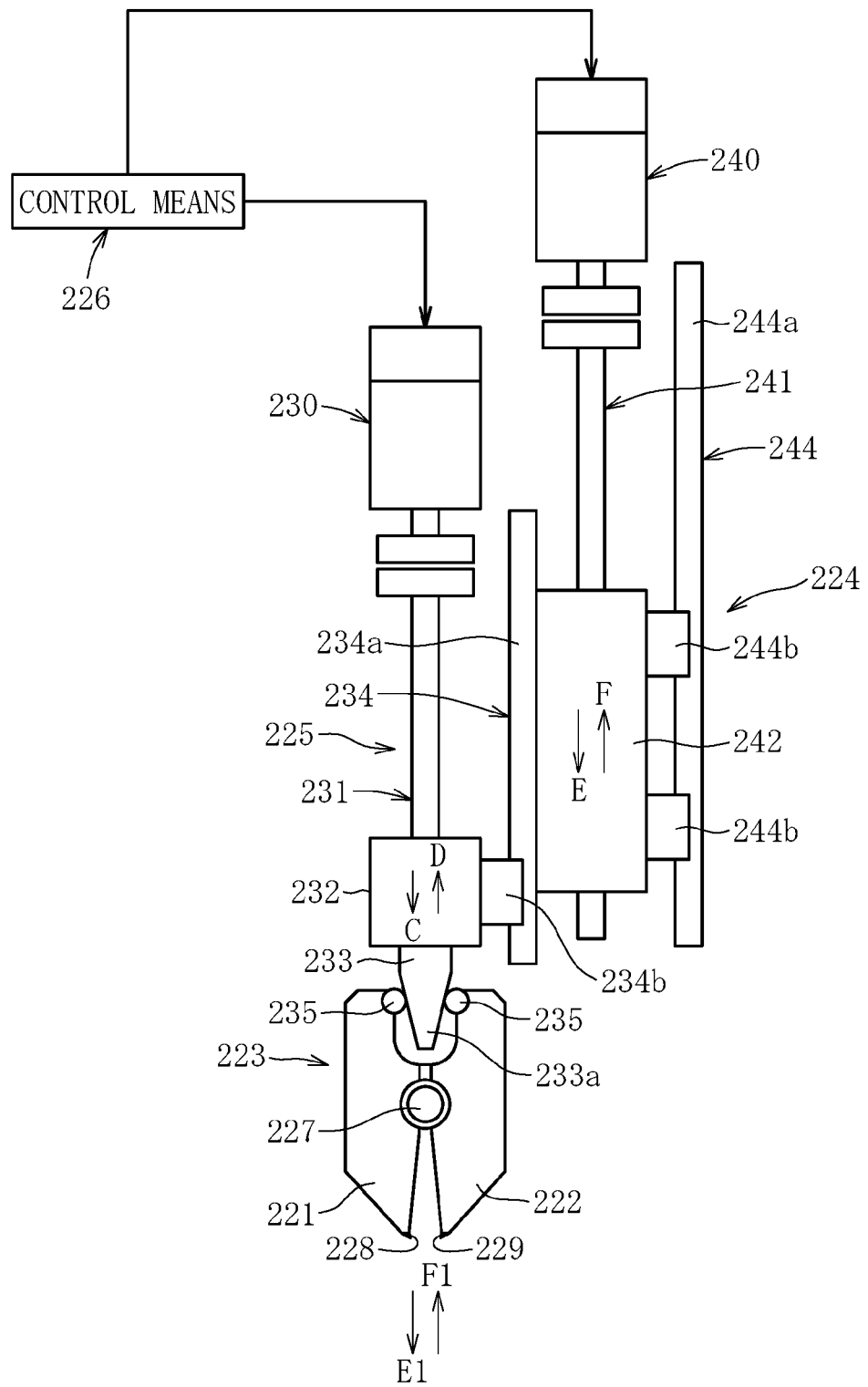
FIG. 13 is a main-part schematic view of another clamping device according to the present invention.

After that, with use of a clamping device illustrated in FIG. 13, the protruding portion 203 and the protruding portion 208 are brought close to each other. With this, the ring portion 210 formed of the belt-like member 201 is radially shrunken. Specifically, the protruding portion 203 is provided on the one end side located on the radially inner side, and the protruding portion 208 is provided on the another end side located on the radially outer side. Thus, when the protruding portion 203 and the protruding portion 208 are brought close to each other, the ring portion 210 is radially shrunken.

Then, the engagement piece 205*b* is engaged with the engagement hole 207, and the engagement piece 205*a* is engaged with the elongated hole 206. In other words, the pair of engagement pieces 205*a* and 205*b* sandwich a partition portion 211 between the elongated hole 206 and the engagement hole 207. In this way, the radially shrunken state can be maintained.

Next, description is made of the clamping device illustrated in FIG. 13. As illustrated in FIG. 13, this device comprises clamping means 223 comprising a pair of claw members 221 and 222, reciprocating means 224 for reciprocating the claw members 221 and 222 of the clamping means 223 into directions in which the claw members 221 and 222 are brought close to and spaced apart from the band mount portion (large diameter portion or small diameter portion) of the boot 10, drive means 225 for pivoting the claw members 221 and 222 of the clamping means 223 into directions in which the claw members 221 and 222 are brought close to and spaced apart from each other, and control means 226 for controlling the reciprocating means and the drive means. Note that, the control means 226 may comprise a microcomputer.

Figure 14A:
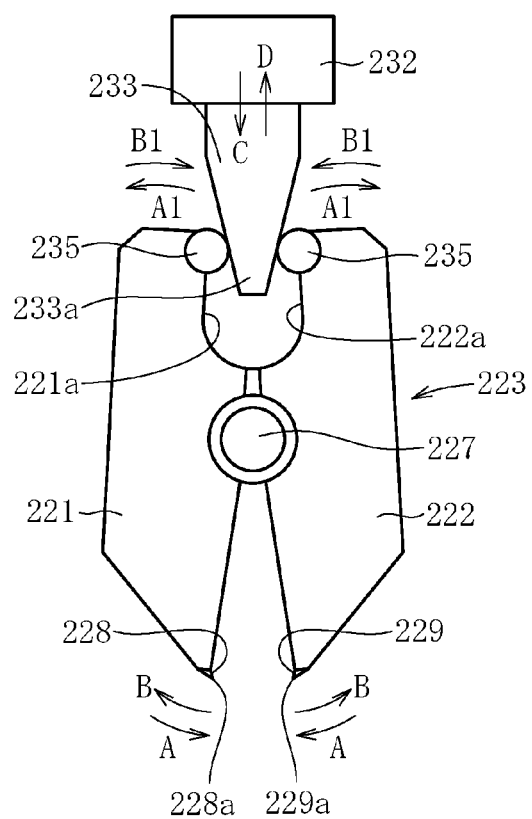
FIG. 14A is an enlarged view of an open state of claw members of the clamping device illustrated in FIG. 13.
Figure 14B:
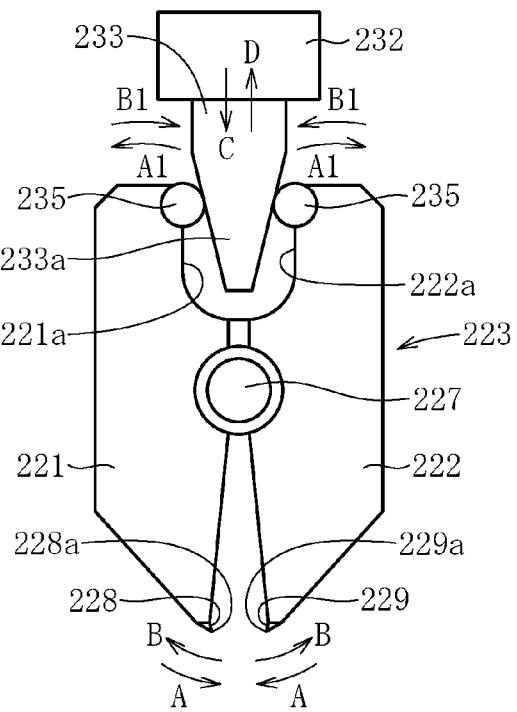
FIG. 14B is an enlarged view of a closed state of the claw members of the clamping device illustrated in FIG. 13.

As illustrated in FIGS. 14A and 14B, the claw members 221 and 222 pivot in directions of arrows A and B about a pivot portion (pivot shaft) 227. In this case, the claw members 221 and 222 are coupled to each other through intermediation of the pivot portion 227 at a longitudinal intermediate portion, and cutout portions 221*a* and 222*a* are provided on opposed surfaces on a proximal end side with respect to the pivot portion 227. Further, at distal ends of opposed surfaces of the claw members 221 and 222, there are provided distal engagement portions 228 and 229 for nipping the protruding portions 203 and 208 of the boot band 200 as described below.

The drive means 225 comprises a servo system comprising a servo motor 230. Specifically, the drive means 225 comprises a rod 231 that reciprocates along its axial direction by being driven by the servo motor 230, and an operating shaft portion 233 is provided continuously with a distal end of the rod 231 through intermediation of a block unit 232. Further, reciprocation of the rod 231 is guided by a guide mechanism 234.

By the way, the servo motor 230 refers to a motor that is used for controlling a position, a speed, and the like in a servo mechanism. The servo motor comprises an AC servo motor, a DC servo motor, and a stepper motor. The AC servo motor has an advantage of being capable of performing positioning control with high accuracy depending on a combination with a positioning function, and the stepper motor has an advantage of capable of performing positioning drive with high accuracy through digital control. In this case, those various conventional motors can be used as the servo motor 230.

The guide mechanism 234 comprises what is called a linear guide mechanism comprising a guide rail 234*a*, and a slider 234*b* that reciprocates along the guide rail 234*a* in directions of arrows C and D. In addition, the slider 234*b* and the block unit 232 are integrated with each other. Thus, when the servo motor 230 is driven, the rod 231 is reciprocated in the directions of the arrows C and D while being guided by the guide mechanism 234.

As illustrated in FIGS. 14A and 14B, the operating shaft portion 233 comprises a tapered portion 233*a* provided at a distal end portion thereof in a radially shrinking manner toward the distal end. Further, the cutout portions 221*a* and 222*a* of the claw members 221 and 222 are provided with sliding contact members 235 and 235. In this case, the claw members 221 and 222 are urged by elastic members (not shown) into directions of arrows B and B1 so as to pivot about the pivot portion 227. Thus, as illustrated in FIG. 14A, under a state in which the operating shaft portion 233 is raised, the sliding contact members 235 and 235 are held in abutment against the distal end side of the tapered portion 233*a*, and the distal engagement portions 228 and 229 each pivot in the direction of the arrow B (that is, open state).

When the operating shaft portion 233 under the state illustrated in FIG. 14A is lowered as illustrated in FIG. 14B, the operating shaft portion 233 intrudes between the cutout portions 221*a* and 222*a* of the claw members 221 and 222. This intrusion causes the sliding contact members 235 and 235 to come into sliding contact with the tapered portion 233*a* of the operating shaft portion 233. As a result, the claw members 221 and 222 pivot in directions of arrows A and A1 about the pivot portion 227. In this state, the distal engagement portions 228 and 229 each pivot in the direction of the arrow A (that is, closed state). Further, when the operating shaft portion 233 in the closed state illustrated in FIG. 14B is raised, the sliding contact members 235 and 235 come into sliding contact with the tapered portion 233*a* of the operating shaft portion 233. As a result, the claw members 221 and 222 pivot in the directions of the arrows B and B1 about the pivot portion 227. In this state, the distal engagement portions 228 and 229 each pivot in the direction of the arrow B (that is, open state).

As illustrated in FIG. 13, the reciprocating means 224 comprises a servo system comprising a servomotor 240. Specifically, the reciprocating means 224 comprises a rod 241 that reciprocates along its axial direction by being driven by the servo motor 240, and a block unit 242 is provided continuously with a distal end of the rod 241. Further, reciprocation of the rod 241 is guided by a guide mechanism 244.

The guide mechanism 244 comprises what is called a linear guide mechanism comprising a guide rail 244a, and sliders 244b that reciprocate along the guide rail 244a in directions of arrows E and F. In addition, the sliders 244b and the block unit 242 are integrated with each other. Thus, when the servo motor 240 is driven, the rod 241 is reciprocated in the directions of the arrows E and F while being guided by the guide mechanism 244.

Further, the guide rail 234a of the guide mechanism 234 of the drive means 225 is provided to the block unit 242. Thus, when the servo motor 240 of the reciprocating means 224 is driven to reciprocate the rod 241 in the directions of the arrows E and F, the claw members 221 and 222 reciprocate in directions of arrows E1 and F1, which are parallel to the directions of the arrows E and F.

Figure 15:
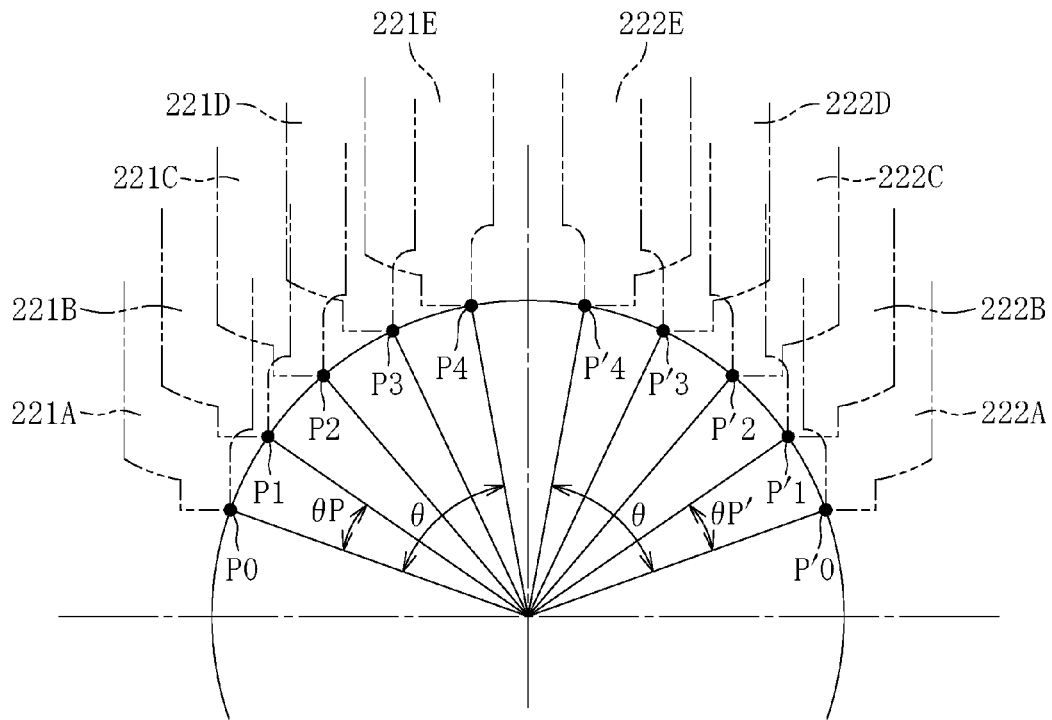
FIG. 15 is a schematic view illustrating movement of the claw members of the clamping device illustrated in FIG. 13.

Calculated values (arithmetic values) obtained as described below are input in advance to the control means 226. The calculated values (arithmetic values) correspond to position coordinates of P0, P1, P2, P3, and P4, and position coordinates of P'0, P'1, P'2, P'3, and P'4 illustrated in FIG. 15. In this case, distal end positions of the distal engagement portions 228 and 229 at clamping starting positions are defined as P0 and P'0, and distal end positions of the distal engagement portions 228 and 229 at clamping ending positions are defined as P4 and P' 4. Then, arithmetic values of all the coordinates from P0 and P'0 to P4 and P'4 are obtained (calculated).

Figure 16:
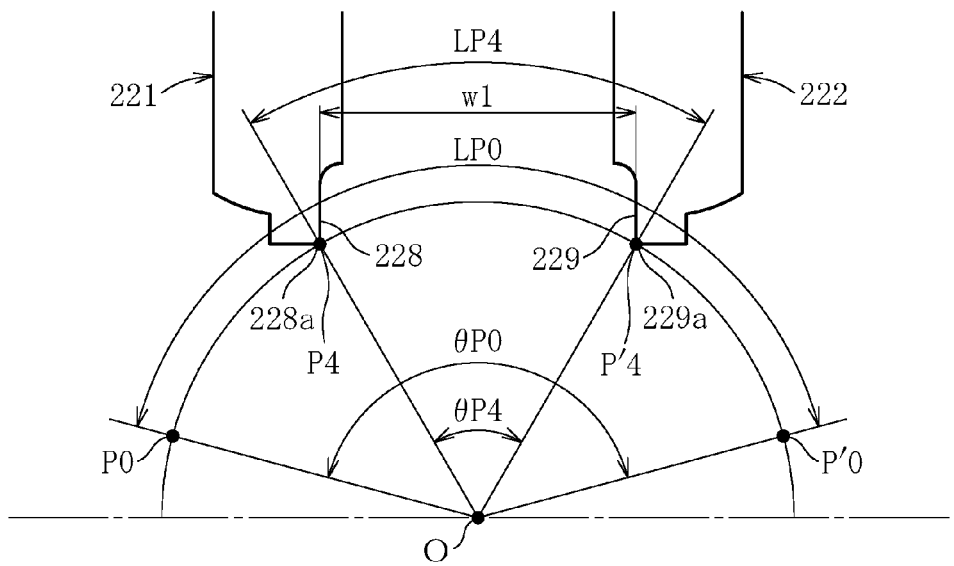
FIG. 16 is a schematic view illustrating a relationship of the claw members and a band after an approach operation of the claw members of the clamping device illustrated in FIG. 13.

In this case, as illustrated in FIG. 16, an angle formed between the position P4 and the position P'4 (θP4) with respect to a center (hereinafter referred to as band center) O of the ring portion 210, and a length of an arc LP4 between the positions P4 and P'4 on a circle comprising a distal end position 228a and a distal end position 229a with respect to the band center O as a center are calculated. Specifically, those parameters are calculated based on a diameter of the band (diameter of the ring portion in a fastened state), a thickness of the band, and a dimension of a clearance between the claw members 221 and 222 at fastening completion positions (dimension between the distal end positions 228a and 229a).

Further, an angle formed between the position P0 and the position P'0 (θP0) with respect to the center (hereinafter referred to as band center) O of the ring portion 210, and a length of an arc LP0 between the positions P0 and P'0 on the circle comprising the distal end position 228a and the distal end position 229a with respect to the band center O as a center are calculated. Those parameters are calculated based on a diameter of the band (diameter of the ring portion in a non-fastened state), a thickness of the band, and a dimension of a clearance between the claw members 221 and 222 at fastening starting positions (dimension between the distal end positions 228a and 229a).

Based on intervening positions (intermediate positions) (P0 to P4 and P'0 to P'4) between positions of a trisection of an angle between the clamping starting position and the clamping ending position, an angle θP of a single operation (refer to FIG. 15) is calculated. Based on this calculation, the coordinates of P0, P1, P2, P3, and P4 are calculated. Further, the coordinates of P'0, P'1, P'2, P'3, and P'4 can be similarly calculated.

Figure 17:
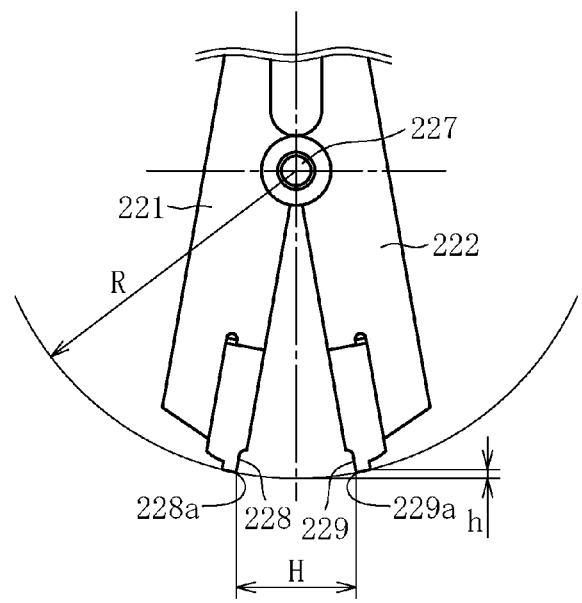
FIG. 17 is a schematic view illustrating a rising amount of the claw members along with an opening operation of the claw members of the clamping device.

By the way, as illustrated in FIG. 17, in a case where the claw members 221 and 222 are pivoted (opened and closed) while fixing a position of the pivot portion 227, when the claw members 221 and 222 in the closed state (state illustrated in FIG. 14B) are opened into the open state (state illustrated in FIG. 14A), the distal end positions 228a and 229a of the distal engagement portions 228 and 229 of the claw members 221 and 222 rise along with the opening of the claw members 221 and 222. Then, a rising amount h with respect to an opening amount H is calculated. In this case, a distance (radius R) from the center O to each of the distal end positions 229a and 79a has already been measured. The rising amount h is corrected with respect to the coordinate positions of P0 to P4 and P'0 to P'4.

Figure 18A:
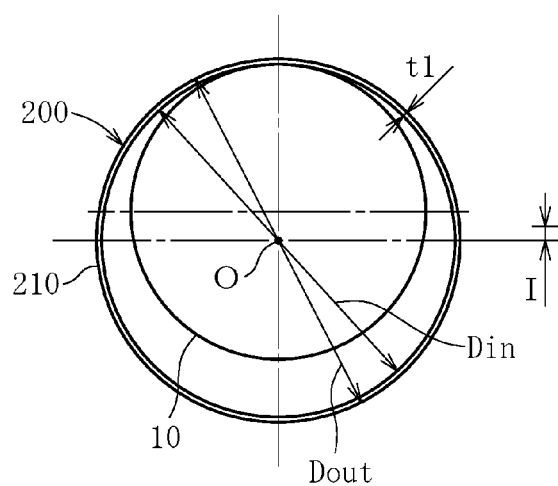
FIG. 18A is a schematic sectional view illustrating a relationship of a boot band and a band mount portion of a boot.
Figure 18B:
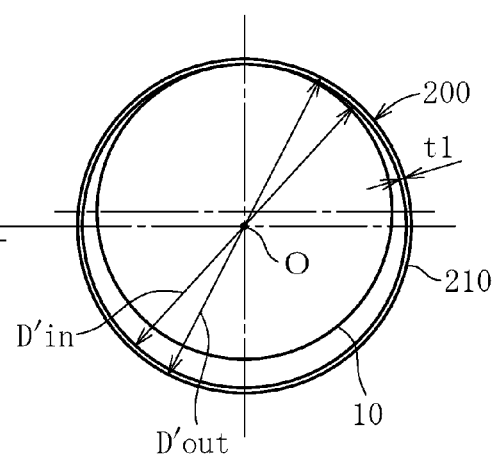
FIG. 18B is another schematic sectional view illustrating the relationship of the boot band and the band mount portion of the boot.

Further, as illustrated in FIG. 18, when the ring portion 210 is radially shrunken, the center of the ring portion 210 rises along therewith. For example, as illustrated in FIG. 18A, under a state in which the band 200 is fitted to the outside of the band mount portion (large diameter portion or small diameter portion of the boot 10), in other words, under a state prior to the radial shrinkage, the band 200 has a thickness t1, and the ring portion has an inner diameter Din and an outer diameter Dout. Further, when the ring portion 210 is radially shrunken into a state illustrated in FIG. 18B (radially shrunken state), the ring portion has an inner diameter D'in and an outer diameter D'out. As is understood from FIGS. 18A and 18B, the center O of the ring portion 210 is displaced by I (displacement amount). Thus, the displacement amount I is corrected with respect to the coordinate positions of P0 to P4 and P'0 to P'4.

Specifically, the coordinate positions of P0 to P4 and P'0 to P'4 with respect to the corrected rising amount h and the corrected displacement amount I are input to the control means 226. In this way, by controlling the reciprocating means 224 and the drive means 225 with the control means 226 storing P0 to P4 and P'0 to P'4 that are input thereto, the positions of the claw members 221 and 222 are changed stepwise to positions illustrated by imaginary lines in FIG. 15.

Next, description is made of a method of clamping the boot 10 with use of this device. By the way, the large diameter portion of the boot 10 is mounted to the opening portion of the outer joint member 33 of the constant velocity universal joint, and the small diameter portion thereof is mounted to the boot mount portion of the shaft 20. Thus, the large diameter portion and the small diameter portion each serve as the band mount portion. Note that, the arithmetic values (corrected arithmetic values) can be input via a key board (touch panel and the like) of the microcomputer as the control means 226.

Thus, the boot 10 is mounted with use of the device as follows. First, the belt-like member 201 serving as the boot band 200 is looped into a ring shape, and the ring portion 210 thus formed is fitted to the outside of the band mount portion (large diameter portion or small diameter portion). In this state, as described above, the protruding portion 203 on the one end side is fitted into the elongated hole 206 from the radially inner side so as to achieve the initial radially shrunken state. In this case, the protruding portion 203 is located on the engagement hole 207 side in the elongated hole 206.

Then, the drive means 225 and the reciprocating means 224 are controlled with the control means 226 so as to nip the protruding portion 208 and the protruding portion 203 with the claw members 221 and 222. Specifically, the distal end positions 228a and 228a of the distal engagement portions 228 and 229 of the claw members 221 and 222 are brought to the positions of P0 and P'0 in FIG. 15. Note that, also in this case, the boot band 200 is positioned with the band positioning means 23, and the axial position of the pair of claw members 221 and 222 is aligned with an axial position of the boot band 200 with use of the position alignment means 26.

After that, with the drive means 225 and the reciprocating means 224, the distal end positions 228a and 229a of the distal engagement portions 228 and 229 of the claw members 221 and 222 are changed stepwise to the positions P1, P'1, P2, P'2, P3, P'3, P4, and P'4 that are calculated as described above. With this, an interval between the protruding portion 208 and the protruding portion 203 can be reduced along the circumferential direction. In this case, the positions of the distal engagement portions 228 and 229 of the claw members 221 and 222 are changed in a manner of following displacements in the radial direction and the circumferential direction of the protruding portions 203 and 208 along with the radial shrinkage of the ring portion 210.

Then, the distal end positions 229a and 229a of the distal engagement portions 228 and 229 of the claw members 221 and 222 are located to P4 and P'4. In this state, the engagement piece 205b is engaged with the engagement hole 207, and the engagement piece 205a is engaged with the elongated hole 56. With this, the radially shrunken state can be maintained. As a result, the band mount portion of the boot 10 can be fastened with the boot band, and fixed in this state.

In the present invention, the pair of protruding portions 203 and 208 can be brought close to each other along the circumferential direction while the distal engagement portions 228 and 229 of the claw members 221 and 222 are prevented from being brought into contact with the ring portion 60 to be radially shrunken or from being separated from the protruding portions 203 and 208. In this way, the radial shrinking operation can be stably performed. Thus, the band mount portion of the boot 10 can be stably fastened, and hence the boot 10 can be stably mounted to the constant velocity universal joint.

Further, the positions of the distal engagement portions 228 and 229 of the pair of claw members 221 and 222 are changed based on the preset arithmetic values. Thus, the operation of bringing the pair of protruding portions 203 and 208 close to each other is stabilized. As a result, the property of the radial shrinkage can be enhanced. Further, in this device, the pivoting operation of the claw members 221 and 222 and the moving operation in the radial direction of the claw members 221 and 222 interlock with each other. Thus, the operation of bringing the pair of protruding portions 203 and 208 close to each other can be smoothly performed. As a result, the radial shrinking operation can be stabilized.

The claw members 221 and 222 are stopped at the plurality of intermediate positions. Thus, an amount of a single operation of the claw members 221 and 222 can be reduced, and an amount of single fastening of the band 200 can be reduced. As a result, a fastening action is stabilized. The reciprocating means 224 and the drive means 225 each may comprise a servo motor. Thus, the operations of the claw members 221 and 222 can be controlled with high accuracy. As a result, the radial shrinkage can be effected with high accuracy.

In this way, by the clamping method using the clamping device of the present invention, the large diameter portion of the boot 10 can be mounted to the outer joint member 33, and the small diameter portion of the boot 10 can be mounted to the boot mount portion of the shaft 20. Thus, when those components are mounted in this way, the boot 10 can be mounted in a stable state, and hence an inside of the joint can be sealed with the boot over a long time period.

The embodiment of the present invention has been described above. The present invention is not limited to the embodiment described above, and various modifications may be made thereto. For example, the product M is not limited to the shaft assembly illustrated in FIG. 10 and the like, and may comprise a fixed type constant velocity universal joint alone, or a plunging type constant velocity universal joint alone. Further, a Rzeppa type is employed as the fixed type constant velocity universal joint in the embodiment described above, but an undercut free type capable of forming high operating angles may be employed. Still further, the plunging type constant velocity universal joint may comprise a double offset type and a Lobro type other than the tripod type. The boot may be made of rubber or resin.

Further, in the embodiment described above, the claw members 221 and 222 illustrated in FIG. 13 are stopped at the three intervening positions (intermediate positions) between the clamping starting position and the clamping ending position. However, the claw members 221 and 222 may be stopped at four or more points, or two or less points. Still further, the drive means and the reciprocating means each comprise a servo motor, but a cylinder mechanism and the like may be employed instead of the servo motor.

INDUSTRIAL APPLICABILITY

The clamping device and the clamping method are used for clamping a boot band for fixing a boot to be mounted to a constant velocity universal joint. Examples of the boot band applicable to a omega-shaped boot band. The omega-shaped boot band comprises a fastening lobe portion (projection portion having a rectangular shape in cross-section) to be plastically deformed (clamped).

REFERENCE SIGNS LIST 10, 10A, 10B boot
11, 11A, 11B boot band
12, 12A, 12B clamping means
13 clamping portion
23 band positioning means
24 position alignment means
25 control means
26 joint positioning means
27 storage means
75 band protruding portion (projection portion)
81 joint rotational drive mechanism
100 positioning jig
101 band rotational drive mechanism
108 band detecting means
108a contact sensor
108b non-contact sensor
120 joint detecting means
120a contact sensor
120b non-contact sensor
130 detecting means for detecting axial position
130a image processing mechanism
130b non-contact sensor
201 belt-like member
203, 208 protruding portion
210 ring portion
221, 222 claw member 223 clamping means
224 reciprocating means
225 drive means
226 control means
227 pivot portion (pivot shaft)
228, 229 distal engagement portion
S constant velocity universal joint
SB plunging type constant velocity universal joint
SA fixed type constant velocity universal joint

The invention claimed is:

1. A clamping device for a boot band for fixing a boot that is mounted to a constant velocity universal joint, the clamping device being configured to radially shrink the boot band with use of clamping means comprising a clamping portion having a pair of claw members, the clamping device comprising:
    band positioning means for positioning the boot band in a circumferential direction;
    joint positioning means for positioning the constant velocity universal joint in a circumferential direction; and
    position alignment means for aligning an axial position of the pair of claw members of the clamping portion of the clamping means with an axial position of the boot band under a state in which the boot band and the constant velocity universal joint are aligned in phase with each other in the circumferential direction with the band positioning means and the joint positioning means.

2. The clamping device according to claim 1, wherein the band positioning means comprises:
    a positioning jig against which a band protruding portion as a part to be clamped is brought into abutment; and
    a band rotational drive mechanism for rotating the boot band along the circumferential direction so as to bring the band protruding portion into abutment against the positioning jig.

3. The clamping device according to claim 1, wherein the band positioning means comprises confirmation detecting means for confirming the positioning.

4. The clamping device according to claim 1, wherein the joint positioning means comprises:
    joint detecting means for detecting a predetermined circumferential position of the constant velocity universal joint; and
    a joint rotational drive mechanism for rotating the constant velocity universal joint along the circumferential direction based on the predetermined circumferential position detected by the joint detecting means.

5. The clamping device according to claim 1, further comprising axial position detecting means for detecting the axial position of the boot band.

6. The clamping device according to claim 5, wherein the axial position detecting means comprises an image processing mechanism.

7. The clamping device according to claim 5, wherein the axial position detecting means comprises a non-contact sensor.

8. The clamping device according to claim 1, wherein detecting means of the band positioning means and detecting means of the joint positioning means each comprise a contact sensor.

9. The clamping device according to claim 1, wherein detecting means of the band positioning means and detecting means of the joint positioning means each comprise a non-contact sensor.

10. The clamping device according to claim 1,
    wherein detecting means of the band positioning means comprises a contact sensor, and
    wherein detecting means of the joint positioning means comprises a non-contact sensor.

11. The clamping device according to claim 1,
    wherein detecting means of the band positioning means comprises a non-contact sensor, and
    wherein detecting means of the joint positioning means comprises a contact sensor.

12. A clamping device for a boot band for fixing a boot that is mounted to a constant velocity universal joint, the clamping device being configured to loop a belt member of the boot band into a ring shape so as to form a ring portion that is fitted to an outside of a band mount portion of the boot, the ring portion comprising a pair of protruding portions spaced apart from each other at a predetermined pitch along a circumferential direction, and configured to bring the pair of protruding portions close to each other in the circumferential direction so as to radially shrink the ring portion with use of clamping means comprising a pair of claw members, the clamping device comprising:
    the clamping means comprising the pair of claw members comprising distal engagement positions that pivot about a pivot portion in a direction in which the distal engagement positions are brought close to and spaced apart from other;
    band positioning means for positioning the boot band;
    position alignment means for aligning an axial position of the pair of claw members of the clamping means with an axial position of the boot band;
    reciprocating means for reciprocating the pair of claw members of the clamping means in a direction in which the pair of claw members of the clamping means are brought close to and spaced apart from the band mount portion of the boot;
    drive means for pivoting the pair of claw members of the clamping means in a direction in which the pair of claw members of the clamping means are brought close to and spaced apart from each other; and
    control means for controlling the reciprocating means and the drive means so as to change positions of the distal engagement portions of the pair of claw members in a manner of following displacements in both a radial direction and the circumferential direction of the pair of protruding portions along with radial shrinkage of the ring portion.

13. The clamping device according to claim 12, wherein the reciprocating means comprises a servo motor.

14. The clamping device according to claim 12, wherein the drive means comprises a servo motor.

* * * * *